US008249429B2

(12) United States Patent
Iwamoto

(10) Patent No.: US 8,249,429 B2
(45) Date of Patent: Aug. 21, 2012

(54) DIGITAL BROADCASTING RECEIVING SYSTEM, DIGITAL BROADCASTING RECEIVER, AND MOBILE COMMUNICATION DEVICE

(75) Inventor: Takanori Iwamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 1311 days.

(21) Appl. No.: 11/912,526

(22) PCT Filed: Apr. 27, 2006

(86) PCT No.: PCT/JP2006/308881
§ 371 (c)(1),
(2), (4) Date: Oct. 25, 2007

(87) PCT Pub. No.: WO2006/118213
PCT Pub. Date: Nov. 9, 2006

(65) Prior Publication Data
US 2009/0067811 A1    Mar. 12, 2009

(30) Foreign Application Priority Data

Apr. 27, 2005    (JP) ................................. 2005-129307

(51) Int. Cl.
*H04N 5/76* (2006.01)
(52) U.S. Cl. .................. 386/291; 455/3.06; 725/139
(58) Field of Classification Search .................. 386/230, 386/259, 291, 297, 330; 455/3.05, 3.06; 348/654; 725/39, 54, 139; 715/721
See application file for complete search history.

(56) References Cited

U.S. PATENT DOCUMENTS 6,005,562 A * 12/1999 Shiga et al. .................. 715/721
7,076,152 B1    7/2006 Eguchi et al.
7,650,626 B2 *  1/2010 Suh .............................. 725/139
2002/0164155 A1  11/2002 Mate
2003/0078000 A1 * 4/2003 Tatsumi et al. .............. 455/3.06
(Continued)

FOREIGN PATENT DOCUMENTS

CN    1302508    7/2001
(Continued)

OTHER PUBLICATIONS

English language Abstract of JP 2002-112153.
(Continued)

*Primary Examiner* — Thai Tran
*Assistant Examiner* — Mishawn Dunn
(74) *Attorney, Agent, or Firm* — Greenblum & Bernstein, P.L.C.

(57) ABSTRACT

When the number of requests for recording is more than the number of tuners by the extension of a broadcast time period of a program that has been timer-recorded as a reserved program, recording instruction information relating to the reserved program that is extended is transmitted to a mobile communication device from an information transmitter in a digital broadcasting receiver. In this case, the recording of the reserved program that is extended is started in the mobile communication device, and another reserved program is recorded by a program recorder in the digital broadcasting receiver. Further, when the number of requests for recording is more than the number of tuners by timer-recording other program or programs within the broadcast time period of the reserved program, recording instruction information relating to the one reserved program is transmitted to the mobile communication device from an information transmitter in the digital broadcasting receiver. In this case, the recording of the one reserved program is started in the mobile communication device, and the other reserved program is recorded by a program recorder in the digital broadcasting receiver.

14 Claims, 27 Drawing Sheets

U.S. PATENT DOCUMENTS

| | | |
|---|---|---|
| 2003/0198462 A1 | 10/2003 | Bumgardner et al. |
| 2003/0206719 A1 | 11/2003 | Bumgardner et al. |
| 2004/0015989 A1 | 1/2004 | Kaizu et al. |
| 2004/0156614 A1 | 8/2004 | Bumgardner et al. |
| 2004/0197082 A1* | 10/2004 | Yim ................................. 386/83 |
| 2004/0209592 A1 | 10/2004 | Kirkeby et al. |
| 2004/0213557 A1 | 10/2004 | Krakirian et al. |
| 2005/0002638 A1 | 1/2005 | Putterman et al. |
| 2005/0002639 A1 | 1/2005 | Putterman et al. |
| 2005/0002640 A1 | 1/2005 | Putterman et al. |
| 2005/0005300 A1 | 1/2005 | Putterman et al. |
| 2005/0152678 A1 | 7/2005 | Sugai et al. |
| 2006/0253451 A1 | 11/2006 | Van De Sluis et al. |
| 2007/0067801 A1 | 3/2007 | Monta et al. |
| 2007/0172198 A1* | 7/2007 | Nakajima et al. ................ 386/83 |
| 2009/0034935 A1 | 2/2009 | Putterman et al. |

FOREIGN PATENT DOCUMENTS

| | | |
|---|---|---|
| CN | 1476722 | 2/2004 |
| CN | 1476722 A | 2/2004 |
| CN | 1592384 | 3/2005 |
| EP | 1471672 | 10/2004 |
| JP | 10-021601 | 1/1998 |
| JP | 2002-016889 | 1/2002 |
| JP | 2002-112153 | 4/2002 |
| JP | 2002-300502 | 10/2002 |
| JP | 2004-215219 | 7/2004 |
| WO | 97/28630 | 8/1997 |
| WO | 2004/081793 | 9/2004 |
| WO | WO2005/036880 | 4/2005 |

OTHER PUBLICATIONS

English language Abstract of JP 2004-215219.

English language Abstract of JP 10-021601.

English language Machine translation of JP 2004-215219.

* cited by examiner

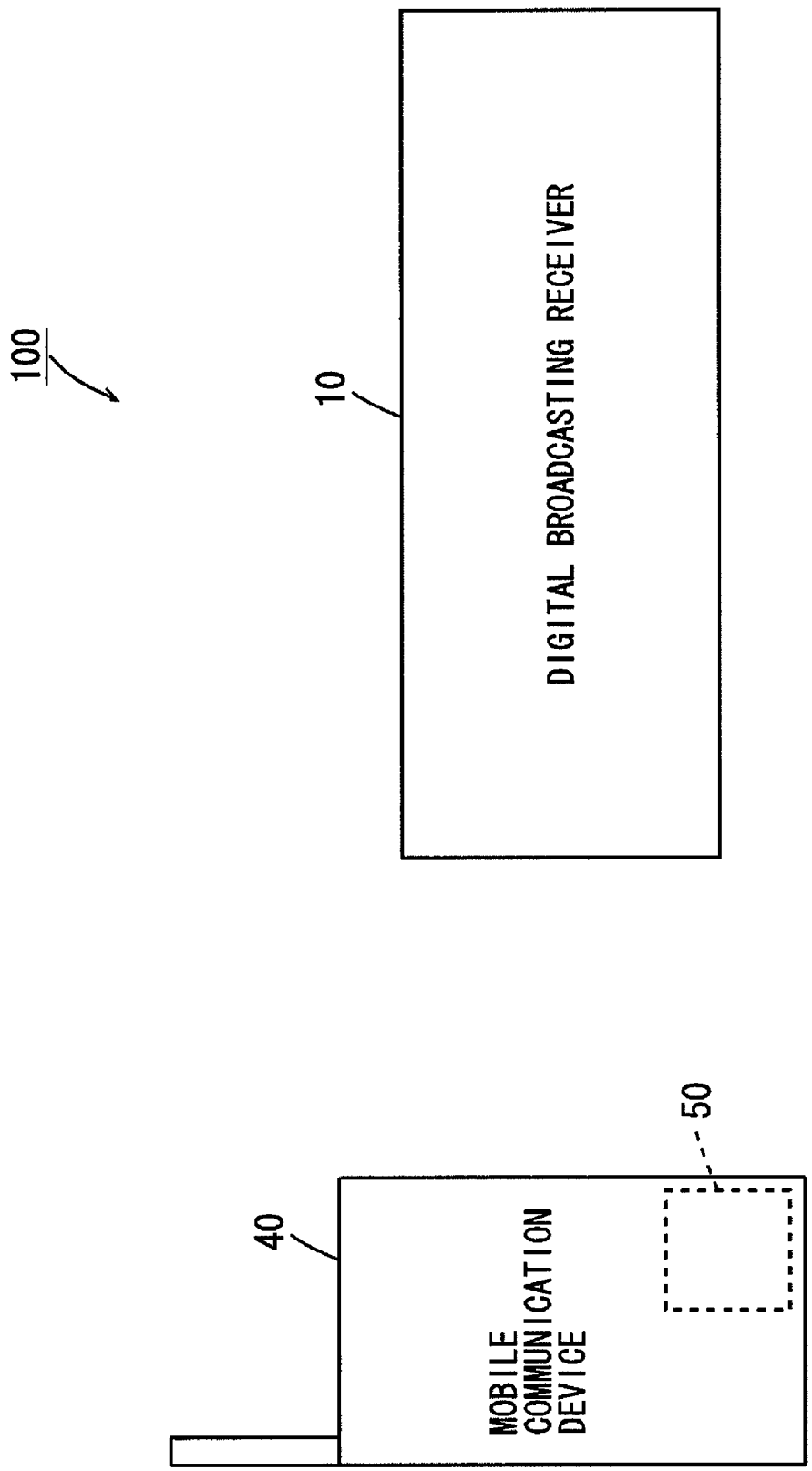

| BROADCASTING STATION | REGION | a REGION | b REGION | c REGION | d REGION |
|---|---|---|---|---|---|
| A | | 3ch | 34ch | 5ch | 7ch |
| B | | 7ch | 9ch | 21ch | 2ch |
| C | | 1ch | 5ch | 11ch | 29ch |
| D | | 5ch | 5ch | 13ch | 41ch |

FIG. 7

| BROADCASTING STATION | A | B | C | D | a | b | c | d |
|---|---|---|---|---|---|---|---|---|
| P.M. | | | | | | | | |
| 18:00 | BASEBALL | | | | | | | |
| 21:00 | | DRAMA | | | SOCCER | VARIETY SHOW | | |
| 22:00 | NEWS | | | | NEWS | | | |

FIG. 11

| BROADCASTING STATION / REGION | a REGION | b REGION | c REGION | d REGION | e REGION | ... |
|---|---|---|---|---|---|---|
| A | 3ch | 34ch | 5ch | 7ch | / | |
| B | 7ch | 9ch | 21ch | 2ch | 9ch | |
| C | 1ch | 5ch | 11ch | 29ch | 11ch | |
| D | 5ch | 5ch | 13ch | 41ch | 1ch | |
| E | 9ch | 13ch | / | 5ch | / | |
| ... | | | | | | |

F I G. 1 3
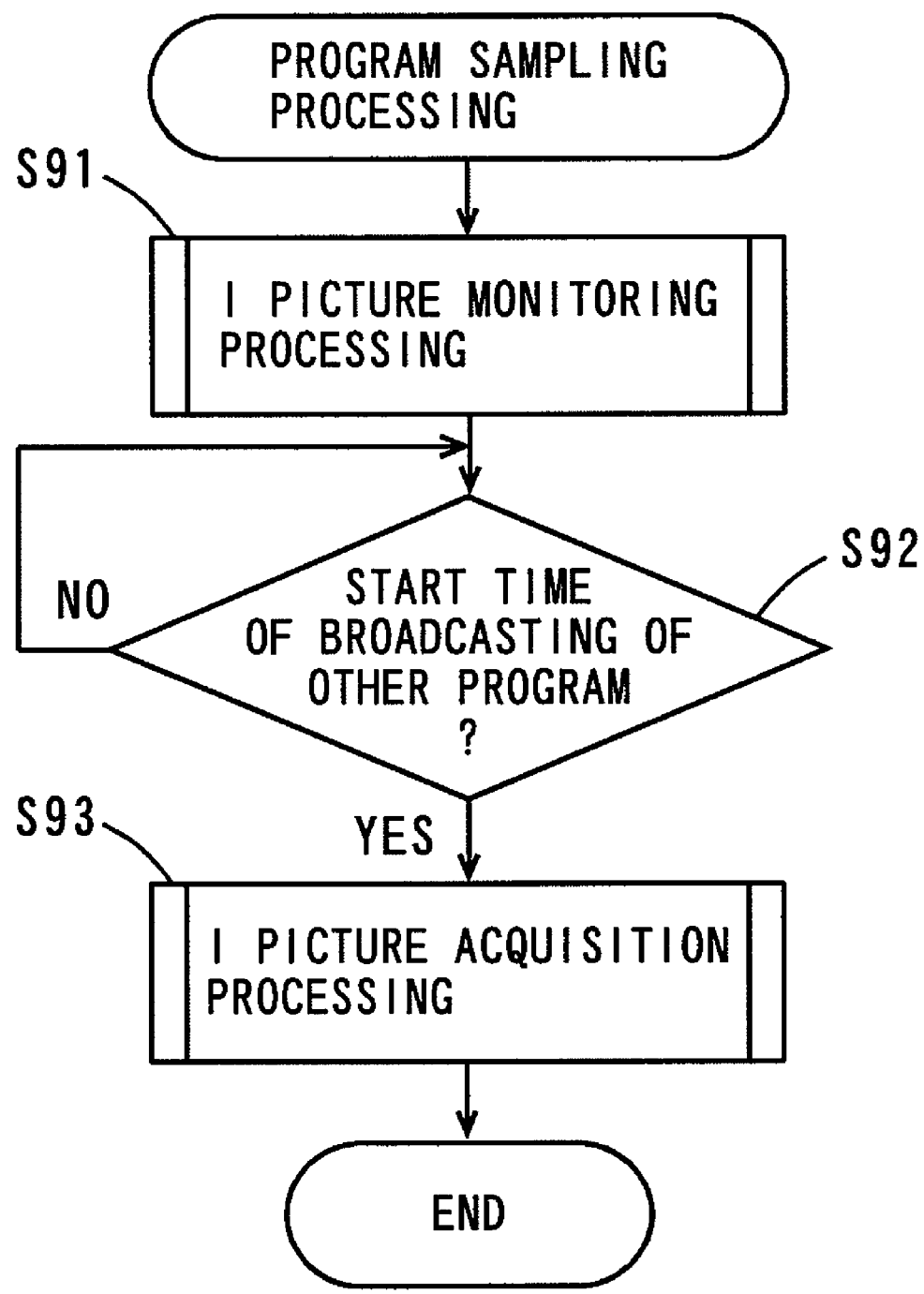

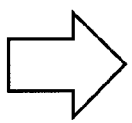
FIG. 19

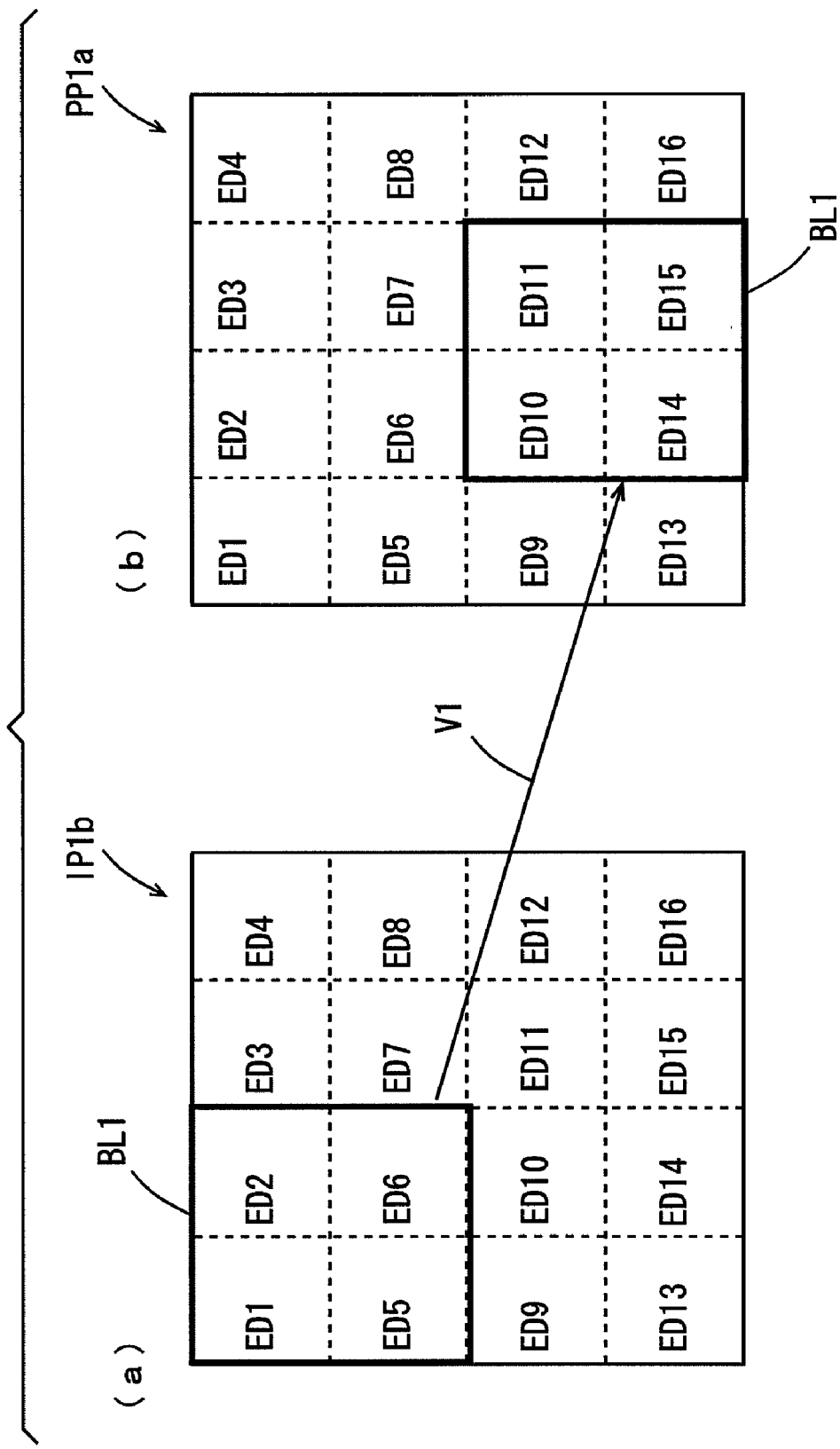
F I G. 21

DIGITAL BROADCASTING RECEIVING SYSTEM, DIGITAL BROADCASTING RECEIVER, AND MOBILE COMMUNICATION DEVICE

TECHNICAL FIELD

The present invention relates to a digital broadcasting receiving system that receives a digital broadcasting signal, a digital broadcasting receiver, and a mobile communication device.

BACKGROUND ART

When programs are recorded by video tape recorders or the like, to timer-record target programs in accordance with program listings in newspapers or the like, for example, allows the programs to be recorded even when users are outdoors, for example.

However, scheduled broadcast time periods of programs such as live broadcasts of sports are extended in many cases. When such programs are timer-recorded in accordance with the program listings in the newspapers or the like, for example, therefore, extended portions of the programs may not, in some cases, be recorded.

In order to solve such programs, in a timer recording system disclosed in Patent Document 1, for example, if a broadcast time period of a program to be timer-recorded or the previous program may be extended, a warning screen indicating that the broadcast time period may be extended is displayed on a television receiver. In this case, a user can designate the extension of a time period of timer recording in accordance with the display of the warning. Even if the broadcast time period of the program to be timer-recorded or the previous program is extended, therefore, the program can be recorded until the end.

[Patent Document 1] JP 10-21601 A

DISCLOSURE OF THE INVENTION

Problems to be Solved by the Invention

In a case where a program that may be extended and a program that is started on another channel after termination of the scheduled broadcast time period of the program are timer-recorded, however, when the broadcast time period of the former program is extended, the former program and the latter program are broadcast in an overlapped manner within the extended broadcast time period. In this case, in the timer recording system disclosed in Patent Document 1, described above, either one of the programs can be only recorded.

Means for Solving the Problems

An object of the present invention is to provide a digital broadcasting system in which programs whose number exceeds the number of programs that can be simultaneously tuned in to by a digital broadcasting receiver can be recorded.

Another object of the present invention is to provide a digital broadcasting receiver and a mobile communication device that allow programs whose number exceeds the number of programs that can be simultaneously tuned in to by the digital broadcasting receiver to be recorded.

Still another object of the present invention is to provide a digital broadcasting receiver that allows program data relating to programs whose number exceeds the number of programs that can be simultaneously tuned in to thereby to be outputted.

(1)

According to an aspect of the present invention, a digital broadcasting receiving system includes a digital broadcasting receiver that receives digital broadcasting, and a mobile communication device having a digital broadcasting receiving function, in which the digital broadcasting receiver includes n (n is a natural number) first receivers that each acquire program data including at least video data from one, corresponding to a selected program, of broadcasting signals on the received digital broadcasting, an information holder that holds timer recording information representing a program that has been timer-recorded, a first data recorder that records the program data relating to a program acquired by each of the n first receivers as program data relating to a first program on the basis of the timer recording information held in the information holder, a first determination unit that determines the number of programs that are requested to be recorded at the same time on the basis of the timer recording information held in the information holder as the number of requests for recording and determines program data relating to a program that is not recorded on the first data recorder as program data relating to a second program when the number of requests for recording exceeds n, and a first communicator that transmits to the mobile communication device recording instruction information for giving an instruction to record the program data relating to the second program when the number of requests for recording exceeds n, the mobile communication device includes a second communicator that receives the recording instruction information transmitted from the digital broadcasting receiver, a second receiver that acquires program data including at least video data from one, corresponding to the second program, of the broadcasting signals on the received digital broadcasting on the basis of the recording instruction information received by the second communicator, and a second data recorder that records the program data acquired by the second receiver.

In the digital broadcasting receiving system, each of the n first receivers in the digital broadcasting receiver acquires the program data including at least the video data from the broadcasting signal corresponding to the selected program out of the broadcasting signals on the digital broadcasting. Further, the information holder holds the timer recording information representing the program that has been timer-recorded.

The first data recorder records the program data relating to the program acquired by each of the n first receivers as the program data relating to the first program on the basis of the timer recording information held in the information holder.

The first determination unit determines that the number of programs that are requested to be recorded at the same time on the basis of the timer recording information as the number of requests for recording, and determines the program data relating to the program that is not recorded on the first data recorder as the program data relating to the second program when the number of requests for recording exceeds n. When the number of requests for recording exceeds n, the first communicator transmits to the mobile communication device the recording instruction information for giving an instruction to record the program data relating to the second program.

On the other hand, when the second communicator in the mobile communication device receives the recording instruction information transmitted from the digital broadcasting receiver, the second receiver acquires the program data including at least the video data from the broadcasting signal corresponding to the second program out of the broadcasting signals on the digital broadcasting on the basis of the recording instruction information. The second data recorder records the program data acquired by the second receiver.

When the number of programs that are requested to be recorded at the same time by the digital broadcasting receiver exceeds n that is the number of first receivers, therefore, the program data relating to the n first programs are recorded on the first data recorder in the digital broadcasting receiver, and the recording instruction information relating to the remaining second program is transmitted to the mobile communication device. Thus, the program data relating to the second program is recorded on the second data recorder in the mobile communication device. Consequently, it is possible to record the programs whose number exceeds the number of programs that can be simultaneously tuned in to by the digital broadcasting receiver. As a result, a user can view the programs whose number exceeds the number of programs that can be simultaneously tuned in to by the digital broadcasting receiver.

(2)

According to another aspect of the present invention, a digital broadcasting receiver that receives digital broadcasting and can communicate with a mobile communication device includes n (n is a natural number) receivers that each acquire program data including at least video data from one, corresponding to a selected program, of broadcasting signals on the received digital broadcasting, an information holder that holds timer recording information representing a program that has been timer-recorded, a data recorder that records the program data relating to a program acquired by each of the n receivers as program data relating to a first program on the basis of the timer recording information held in the information holder, a determination unit that determines the number of programs that are requested to be recorded at the same time on the basis of the timer recording information held in the information holder as the number of requests for recording and determines program data relating to a program that is not recorded on the data recorder as program data relating to a second program when the number of requests for recording exceeds n, and a communicator that transmits to the mobile communication device recording instruction information for giving an instruction to record the program data relating to the second program when the number of requests for recording exceeds n.

In the digital broadcasting receiver, each of the n receivers acquires the program data including at least the video data from the broadcasting signal corresponding to the selected program out of the broadcasting signals on the digital broadcasting. Further, the information holder holds the timer recording information representing the program that has been timer-recorded.

The data recorder records the program data relating to the program acquired by each of the n receivers on the basis of the timer recording information held in the information holder as the program data relating to the first program.

The determination unit determines that the number of programs that are requested to be recorded at the same time on the basis of the timer recording information as the number of requests for recording, and determines the program data relating to the program that is not recorded on the data recorder as the program data relating to the second program when the number of requests for recording exceeds n. When the number of requests for recording exceeds n, the communicator transmits to the mobile communication device the recording instruction information for giving an instruction to record the program data relating to the second program.

When the number of programs that are requested to be recorded at the same time by the digital broadcasting receiver exceeds n that is the number of receivers, therefore, the program data relating to the n first programs are recorded on the data recorder by the digital broadcasting receiver, and the recording instruction information relating to the remaining second program is transmitted to the mobile communication device.

In this case, the program data relating to the second program is recorded in the mobile communication device in response to the recording instruction information relating to the second program transmitted from the digital broadcasting receiver, which allows the programs whose number exceeds the number of programs that can be simultaneously turned in to by the digital broadcasting receiver to be recorded. As a result, a user can view the programs whose number exceeds the number of programs that can be simultaneously tuned in to by the digital broadcasting receiver.

(3)

The digital broadcasting receiver may further include an extractor that extracts extension information representing the extension of a broadcast time period of the program that has been timer-recorded from the broadcasting signal on the received digital broadcasting, in which the determination unit may determine the number of requests for recording on the basis of the extension information extracted by the extractor and the timer recording information held in the information holder and determine program data relating to an extended portion of the program that has been timer-recorded or program data relating to the other program as the program data relating to the second program when the number of requests for recording exceeds n by the extension of the program that has been timer-recorded.

In this case, when the number of requests for recording exceeds n by the extension of the program that has been timer-recorded, the program data relating to the extended portion of the program that has been timer-recorded or the program data relating to the other program can be recorded in the mobile communication device.

(4)

The digital broadcasting receiver may further include a correspondence information recorder that records correspondence information representing a correspondence relationship among a region, a broadcasting station, and a frequency, in which the communicator may specify the frequency of the second program whose recording is designated on the basis of the correspondence information recorded on the correspondence information recorder, and transmit to the mobile communication device recording instruction information including the specified frequency.

In this case, the correspondence information representing the correspondence relationship among the region, the broadcasting station, and the frequency is recorded on the correspondence information recorder in the digital broadcasting receiver. Therefore, the frequency of the second program whose recording has been designated is specified on the basis of the correspondence information, and the recording instruction information including the specified frequency is transmitted to the mobile communication device.

This makes it easy to specify the frequency of the second program whose recording has been designated by the recording instruction information in the mobile communication device. Further, it is possible to easily select the broadcasting signal corresponding to the second program on the basis of the specified frequency.

Furthermore, it is possible to record the correspondence information among a large number of regions by increasing the storage capacity of the correspondence information recorder provided in the digital broadcasting receiver.

(5)

The determination unit may change, when the communicator receives an impossible-to-acquire signal indicating that it is impossible for the mobile communication device to acquire the program data relating to the second program designated by the recording instruction information, any one of the original first programs into a new second program and change the original second program into a new first program, and the communicator may transmit to the mobile communication device the recording instruction information for giving an instruction to record program data relating to the new second program.

When the receiving intensity of the broadcasting signal corresponding to the second program is low or when the frequency of the broadcasting signal corresponding to the second program is unclear, it is impossible for the mobile communication device to acquire the program data relating to the second program. In this case, any one of the original first programs is changed into a new second program, and the original second program is changed into a new first program. This allows program data relating to the new second program to be acquired in the mobile communication device.

(6)

Any one of the n receivers may intermittently select the broadcasting signal corresponding to the second program. The digital broadcasting receiver may further include a picture recorder that extracts an I picture from the broadcasting signal selected by the receiver and records the extracted I picture, and a corrector that corrects the program data relating to the second program recorded in the mobile communication device using the I picture recorded by the picture recorder, to generate restored program data.

In this case, the data recorder records the program data relating to the first program, and the picture recorder records the I picture in the second program. A B picture and a P picture in the program data relating to the second program recorded in the mobile communication device are corrected using the I picture with a high image quality. This allows the restored program data with a high image quality to be generated from the program data relating to the second program.

(7)

The corrector may generate a reference image on the basis of a difference between the I picture recorded by the picture recorder and the I picture in the program data relating to the second program recorded in the mobile communication device, to correct the program data relating to the second program on the basis of the generated reference image.

In this case, the reference image is generated on the basis of the difference between the I picture with a high image quality and the I picture in the program data relating to the second program, and the B picture and the P picture in the program data relating to the second program are corrected to a high image quality on the basis of the reference image. This allows the restored program data with a higher image quality to be generated from the program data relating to the second program.

(8)

The corrector may calculate a motion vector from the program data relating to the second program recorded in the mobile communication device, and add pixel values in a block of the reference image to pixel values in a corresponding block of the P picture in the program data relating to the second program on the basis of the calculated motion vector, to generate restored program data.

In this case, the P picture in a moving picture is corrected to a high image quality. This allows the restored program data relating to the moving picture with a high image quality to be generated.

(9)

The corrector may generate a B picture in the restored program data on the basis of the I picture recorded by the picture recorder and the P picture in the program data relating to the second program recorded in the mobile communication device.

In this case, the B picture with a high image quality is generated on the basis of the I picture with a high quality and the P picture in the program data relating to the second program. This allows the restored program data with a high image quality to be generated.

(10)

The digital broadcasting receiver may further include a period calculator that previously calculates the period of the I picture in the program data relating to the second program, in which the receiver may select the broadcasting signal corresponding to the second program in the period calculated by the period calculator.

In this case, the I picture can be accurately extracted from the broadcasting signal corresponding to the second program.

(11)

The digital broadcasting receiver may further include a picture difference detector that detects a difference value between pictures in the broadcasting signal corresponding to the first program selected by the receiver, and a difference value determination unit that determines whether or not the difference value detected by the picture difference detector is not more than a predetermined threshold value, in which the receiver may select, when the picture difference determination unit determines that the difference value is not more than the threshold value, the broadcasting signal corresponding to the second program in the period calculated by the period calculator.

In this case, when the change of the picture in the broadcasting signal corresponding to the first program is small, the broadcasting signal corresponding to the second program is selected. This prevents the program data relating to the second program recorded on the data recorder from being degraded.

(12)

According to still another aspect of the present invention, a digital broadcasting receiver that receives digital broadcasting include a receiver that acquires program data including at least video data from one, corresponding to a selected first program, of broadcasting signals on the received digital broadcasting, a controller that controls the receiver so as to intermittently select a broadcasting signal corresponding to a second program different from the first program in the period of an I picture, an extractor that extracts the I picture from the broadcasting signal corresponding to the second program selected by the receiver, and an output circuit that outputs the program data relating to the first program acquired by the receiver and the I picture in the second program extracted by the extractor.

In the digital broadcasting receiver, the program data including at least the video data is acquired from the broadcasting signal corresponding to the selected first program out of the broadcasting signals on the digital broadcasting received by the receiver. The controller controls the receiver such that the broadcasting signal corresponding to the second program is intermittently selected in the period of the I picture. Further, the extractor extracts the I picture from the broadcasting signal corresponding to the second program selected by the receiver, and the output circuit outputs the program data relating to the first program and the I picture in the second program.

This allows data representing programs whose number exceeds the number of programs that can be simultaneously tuned in to be outputted. In this case, it is possible to display the first program by a video with a high image quality using the program data relating to the first program and to display a video in the second program using the I picture in the second program. As a result, the user can view the programs whose number exceeds the number of programs that can be simultaneously tuned in to.

(13)

According to a further aspect of the present invention, a mobile communication device that has a digital broadcasting receiving function and can communicate with a digital broadcasting receiver includes a communicator that receives recording instruction information for giving an instruction to record program data relating to a program from the digital broadcasting receiver, a receiver that acquires program data including at least video data from one, corresponding to the program, of broadcasting signals on the received digital broadcasting on the basis of the recording instruction information received by the communicator, and a data recorder that records the program data acquired by the receiver.

In the mobile communication device, when the communicator receives the recording instruction information from the digital broadcasting receiver, the receiver acquires the program data including at least the video data from the broadcasting signal corresponding to the program designated by the recording instruction information out of the broadcasting signals on the digital broadcasting on the basis of the recording instruction information. The data recorder records the program data acquired by the receiver.

In this case, even if the programs whose number exceeds the number of programs that can be simultaneously tuned in to are requested to be recorded in the digital broadcasting receiver, the recording instruction information is transmitted to the mobile communication device from the digital broadcasting receiver, so that the data recorder in the mobile communication device records the program data relating to the program designated by the recording instruction information.

Consequently, it is possible to record the programs whose number exceeds the number of programs that can be simultaneously tuned in to by the digital broadcasting receiver. As a result, the user can view the programs whose number exceeds the number of programs that can be simultaneously tuned in to by the digital broadcasting receiver.

(14)

The mobile communication device may further include a correspondence information recorder that records correspondence information representing a correspondence relationship among a region, a broadcasting station, and a frequency, and a position detector that detects the current position, in which the receiver may specify the frequency of the program whose recording has been designated on the basis of the recording instruction information received by the communicator, the correspondence information recorded by the correspondence information recorder, and the current position detected by the position detector, to select the broadcasting signal corresponding to the program on the basis of the specified frequency.

In this case, the correspondence information recorder records the correspondence information representing the correspondence relationship among the region, the broadcasting station, and the frequency, and the position detector detects the current position. Therefore, the frequency of the program whose recording has been designated is specified on the basis of the recording instruction information, the correspondence information, and the current position. Consequently, it is possible to easily select the broadcasting signal corresponding to the program whose recording has been designated on the basis of the specified frequency.

(15)

The mobile communication device may further include a position detector that detects the current position, in which the receiver may specify the frequency of the program whose recording has been designated on the basis of the recording instruction information including the frequency received by the communicator and the current position detected by the position detector, to select the broadcasting signal corresponding to the program on the basis of the specified frequency.

When the recording instruction information transmitted to the mobile communication device from the digital broadcasting receiver includes the frequency of the program, the frequency of the program whose recording has been designated can be easily specified on the basis of the recording instruction information and the current position detected by the position detector. Further, it is possible to easily select the broadcasting signal corresponding to the program on the basis of the specified frequency.

(16)

The mobile communication device may further include a determination unit that determines whether or not the program data relating to the program designated by the recording instruction information received by the communicator can be acquired, in which the communicator may transmit, when the determination unit determines that the program data relating to the program designated by the recording instruction information cannot be acquired, an impossible-to-acquire signal indicating that it is impossible to acquire the program data relating to the program designated by the recording instruction information to the digital broadcasting receiver.

When the receiving intensity of the broadcasting signal corresponding to the program designated by the recording instruction information is low or when the frequency of the broadcasting signal corresponding to the program is unclear, it is impossible for the receiver to acquire the program data relating to the program.

In this case, the impossible-to-acquire signal is transmitted to the digital broadcasting receiver, so that the digital broadcasting receiver can recognize that it is impossible for the mobile communication device to acquire the program data relating to the program designated by the recording instruction information and change the program whose recording is designated for the mobile communication device. This causes program data relating to a new program to be acquired in the mobile communication device.

Effects of the Invention

According to the present invention, it is possible to record programs whose number exceeds the number of programs that can be simultaneously tuned in to by a digital broadcasting receiver.

Furthermore, it is possible to output program data relating to programs whose number exceeds the number of programs that can be simultaneously tuned in to.

BRIEF DESCRIPTION OF THE DRAWINGS

FIG. 1 is a diagram showing the outline of a digital broadcasting receiving system according to the present invention.

FIG. 7 is a diagram showing an example of a broadcasting schedule of programs.

FIG. 11 is a diagram showing an example of a frequency table.

FIG. 13 is a flow chart showing program sampling processing by a controller.

FIG. 19 is a schematic view showing the process of image correction processing.

FIG. 21 is a schematic view showing the process of image correction processing.

BEST MODE FOR CARRYING OUT THE INVENTION

Figure 2:
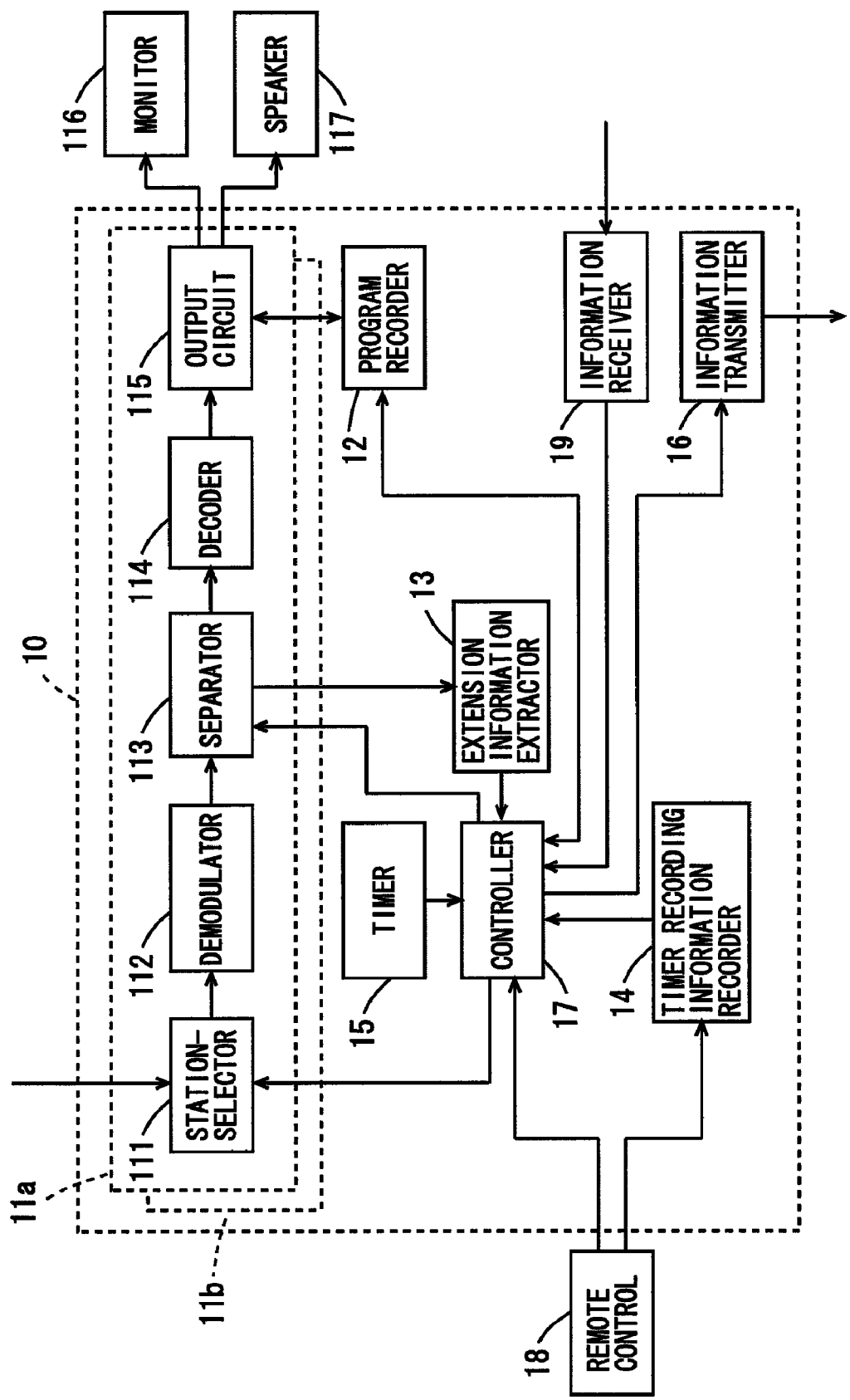
FIG. 2 is a block diagram showing the configuration of a digital broadcasting receiver in a digital broadcasting receiving system according to a first embodiment.

The embodiments of the present invention will be described in detail referring to the drawings. The embodiments below describe a digital broadcasting receiving system and a digital broadcasting receiver.

(1) First Embodiment

(1-1) Configuration of Digital Broadcasting Receiver

FIG. 1 is a block diagram showing the outline of a digital broadcasting receiving system according to a first embodiment of the invention.

As shown in FIG. 1, a digital broadcasting receiving system 100 includes a digital broadcasting receiver 10 and a mobile communication device 40.

The digital broadcasting receiver 10 is a digital television or a set top box (STB) capable of receiving digital broadcasting. In the present embodiment, the digital broadcasting receiver 10 receives 12 segment broadcasting signals, for example.

The mobile communication device 40 is a cellular phone, a PDA (Personal Digital Assistant), an on-vehicle receiver, or the like capable of receiving digital broadcasting. A recording medium 50 is mounted on the mobile communication device 40. The recording medium 50 is a memory card or the like. In the present embodiment, the mobile communication device 40 receives a one-segment broadcasting signal, for example.

FIG. 2 is a block diagram showing the configuration of the digital broadcasting receiver 10 shown in FIG. 1.

As shown in FIG. 2, the digital broadcasting receiver 10 includes tuners 11a and 11b, a program recorder 12, an extension information extractor 13, a timer recording information recorder 14, a timer 15, an information transmitter 16, an information receiver 19, and a controller 17.

Each of the tuners 11a and 11b includes a station selector 111, a demodulator 112, a separator 113, a decoder 114, and an output circuit 115.

The station selector 111 selects the frequency of a broadcasting signal transmitted from a broadcasting station to tune in to the broadcasting signal, and outputs the broadcasting signal tuned in to.

The demodulator 112 demodulates the broadcasting signal outputted from the station selector 111, and outputs a transport stream (hereinafter referred to as TS) conforming to MPEG (Moving Picture Experts Group) Standards.

The separator 113 subjects the TS outputted from the demodulator 112 to filtering processing conforming to MPEG Standards, to separate a video stream, a voice stream, various types of information, and so on corresponding to a particular program.

The decoder 114 decodes the voice stream and the video stream that are outputted from the separator 113, to output voice data and video data. In the digital broadcasting receiver 10 according to the present embodiment, the video data has a video format in a progressive system with 1080 horizontal scanning lines, for example.

The output circuit 115 subjects the voice data and the video data that are outputted from the decoder 114 to D/A (Digital/Analog) conversion, to output a voice signal to a speaker 117 and output a video signal to a monitor 116. Note that the speaker 117 and the monitor 116 may be contained in the digital broadcasting receiver 10, or may be provided separately from the digital broadcasting receiver 10.

Furthermore, the output circuit 115 outputs the voice data and the video data to the program recorder 12.

The number of broadcasting signals that can be simultaneously tuned in to by the digital broadcasting receiver 10 is equal to the number of tuners. In the present embodiment, the digital broadcasting receiver 10 includes the two tuners, i.e., the tuners 11a and 11b, which allows two broadcasting signals to be simultaneously tuned in to.

The program recorder 12 records the voice data and the video data that are outputted from the output circuit 115. Note that the program recorder 12 may be provided outside the digital broadcasting receiver 10.

The extension information extractor 13 extracts extension start information and extension termination information from the information separated by the separator 113. The extension start information indicates that a program is extended, and is transmitted from the broadcasting station when a broadcast time period of the program is determined to be extended. The extension termination information indicates the termination time of the extended program, and is transmitted from the broadcasting station when the termination time of broadcasting of the extended program is determined. The extension start information and the extension termination information are generically referred to as extension information.

The extension information extractor 13 may extract extension information relating to a program from a program listing such as EPG (Electronic Program Guide), for example.

Information relating to a program that is requested to be recorded by a user (hereinafter referred to timer recording information) is recorded on the timer recording information recorder 14. That is, timer recording information relating to a desired program is recorded on the timer recording information recorder 14, so that the program is timer-recorded.

The timer recording information includes information for identifying a program, for example, a channel on which the program is broadcast, the title of the program, a scheduled broadcast time period (including the scheduled start time and the scheduled termination time of broadcasting) of the program, and the contents of the program. The timer recording information is recorded on the timer recording information recorder 14 (timer-recording) by the user operating a remote control 18 or an operation panel (not shown) in the digital broadcasting receiver 10.

Note that the timer recording information recorder 14 may be integral with the program recorder 12.

The timer 15 outputs time information representing the current time to the controller 17.

The information transmitter 16 transmits recording instruction information to the mobile communication device 40 shown in FIG. 1. The recording instruction information includes the title of a program whose recording is designated for the mobile communication device 40 and a broadcasting station at which the program is broadcast. The details will be described later.

The information receiver 19 receives impossible-to-receive information from the mobile communication device 40 shown in FIG. 1. The impossible-to-receive information indicates that the mobile communication device 40 cannot receive a broadcasting signal corresponding to the program designated by the recording instruction information. The details will be described later.

The controller 17 controls each of the components constituting the digital broadcasting receiver 10 on the basis of the operation of the remote control 18 by the user, the extension information extracted by the extension information extractor 13, the timer recording information recorded on the timer recording information recorder 14, the time information from the timer 15, and the impossible-to-receive information received by the information receiver 19. The details of control processing by the controller 17 will be described later.

Figures 3, 4:
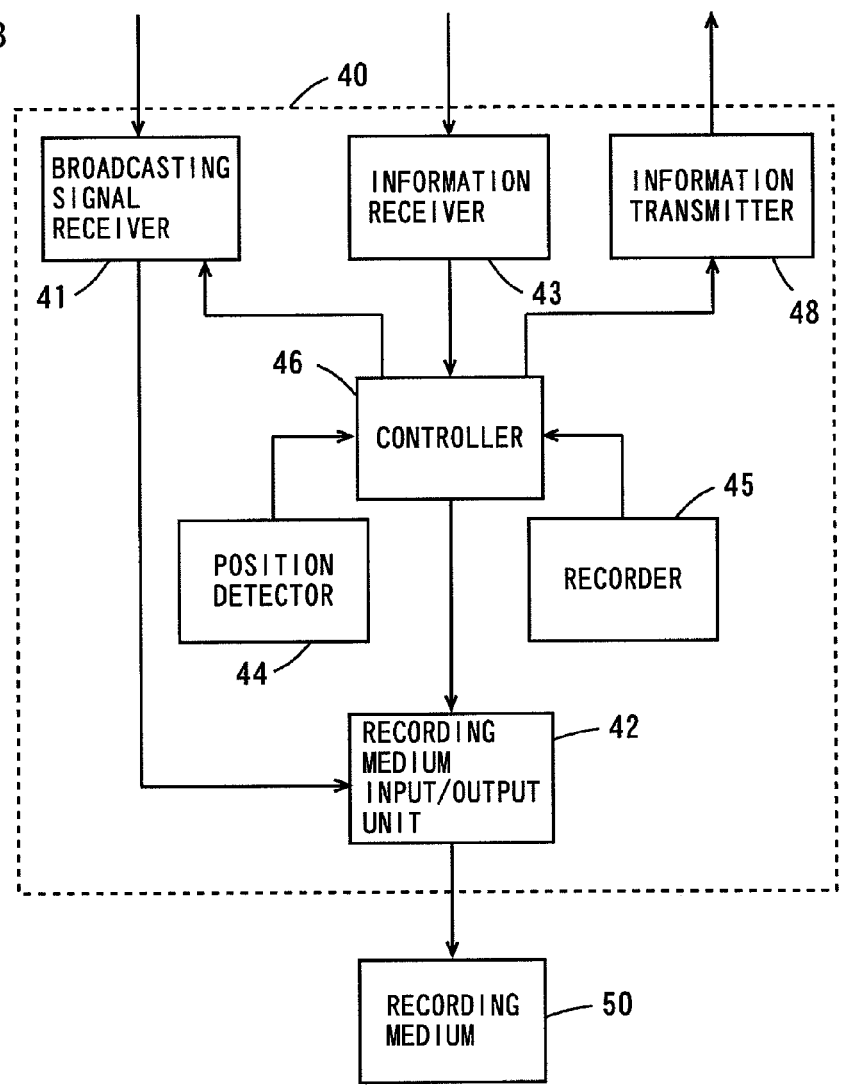
FIG. 3 is a block diagram showing the configuration of a mobile communication device according to the first embodiment.
FIG. 4 is a diagram showing an example of a channel corresponding to a broadcasting system from each broadcasting station.

The configuration of the mobile communication device 40 shown in FIG. 1 will be then described. FIG. 3 is a block diagram showing the configuration of the mobile communication device 40.

As shown in FIG. 3, the mobile communication device 40 includes a broadcasting signal receiver 41, a recording medium input/output unit 42, an information receiver 43, an information transmitter 48, a position detector 44, a recorder 45, and a controller 46.

The broadcasting signal receiver 41 selects the frequency of a broadcasting signal transmitted from a broadcasting station to tune in to the broadcasting signal, and decodes from the broadcasting signal voice data and video data relating to a designated program. In the mobile communication device 40 according to the present embodiment, the video data has a video format in a progressive system with 525 horizontal scanning lines, for example.

The recording medium input/output unit 42 inputs and outputs the voice data and the video data that are obtained by the broadcasting signal receiver 41 to the recording medium 50.

The recording medium input/output unit 42 and the recording medium 50 may be integral with each other, or the recording medium 50 may be removably mounted on the recording medium input/output unit 42.

The information receiver 43 receives the recording instruction information transmitted from the information transmitter 16 (FIG. 2) in the digital broadcasting receiver 10.

The information transmitter 48 transmits the impossible-to-receive information to the information receiver 19 (FIG. 2) in the digital broadcasting receiver 10.

The position detector 44 outputs positional information representing the current position of the mobile communication device 40 using GPS (Global Positioning System), for example.

Channel information corresponding to a broadcasting signal from a desired broadcasting station is recorded on the recorder 45.

Here, a channel corresponding to a broadcasting signal from each of the broadcasting stations differs depending on a region where the mobile communication device 40 is positioned.

FIG. 4 shows an example of a channel corresponding to a broadcasting signal from each of broadcasting stations. FIG. 4 shows that a channel corresponding to a broadcasting signal from a broadcasting station A, for example, is Channel 3 in a region a and Channel 34 in a region b. Even when a broadcasting signal from the same broadcasting station is received, a channel that differs depending on a region where the mobile communication device 40 is positioned must be set.

In the present embodiment, channel information corresponding to a predetermined region is recorded on the recorder 45. For example, channel information respectively corresponding to the region a and the region b in FIG. 4 are recorded on the recorder 45.

A center frequency is assigned to each of the channels. For example, 473.14 MHz is assigned to Channel 13, 479.14 MHz is assigned to Channel 14, and 485.142 MHz is assigned to Channel 15.

The controller 46 controls each of the units in the mobile communication device 40 on the basis of the recording instruction information received by the information receiver 43, the positional information detected by the position detector 44, and the channel information recorded on the recorder 45. Control processing by the controller 46 will be described later.

(1-2) Control Processing at the Time of Recording

Control processing in a case where a program that has been timer-recorded (hereinafter referred to as a reserved program) is recorded in the digital broadcasting receiving system 100 will be then described.

(1-2-1) First Example of Control

In a first example of control, description is made of a case where a program whose broadcast time period may be extended is timer-recorded as a reserved program and no other program is timer-recorded within a scheduled broadcast time period of the reserved program.

Figure 5:
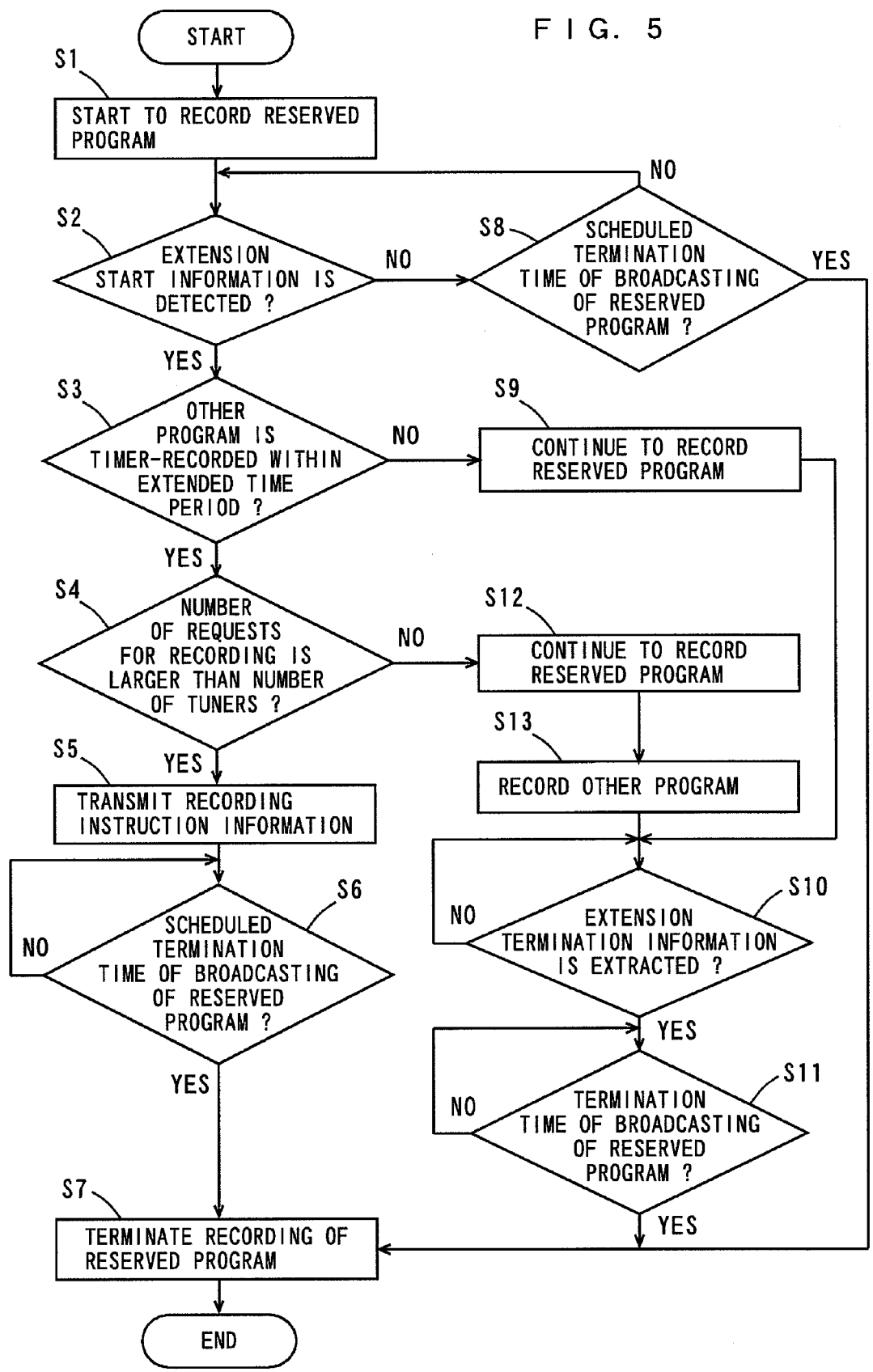
FIG. 5 is a flow chart showing a first example of control by a controller in a digital broadcasting receiver.
Figure 6:
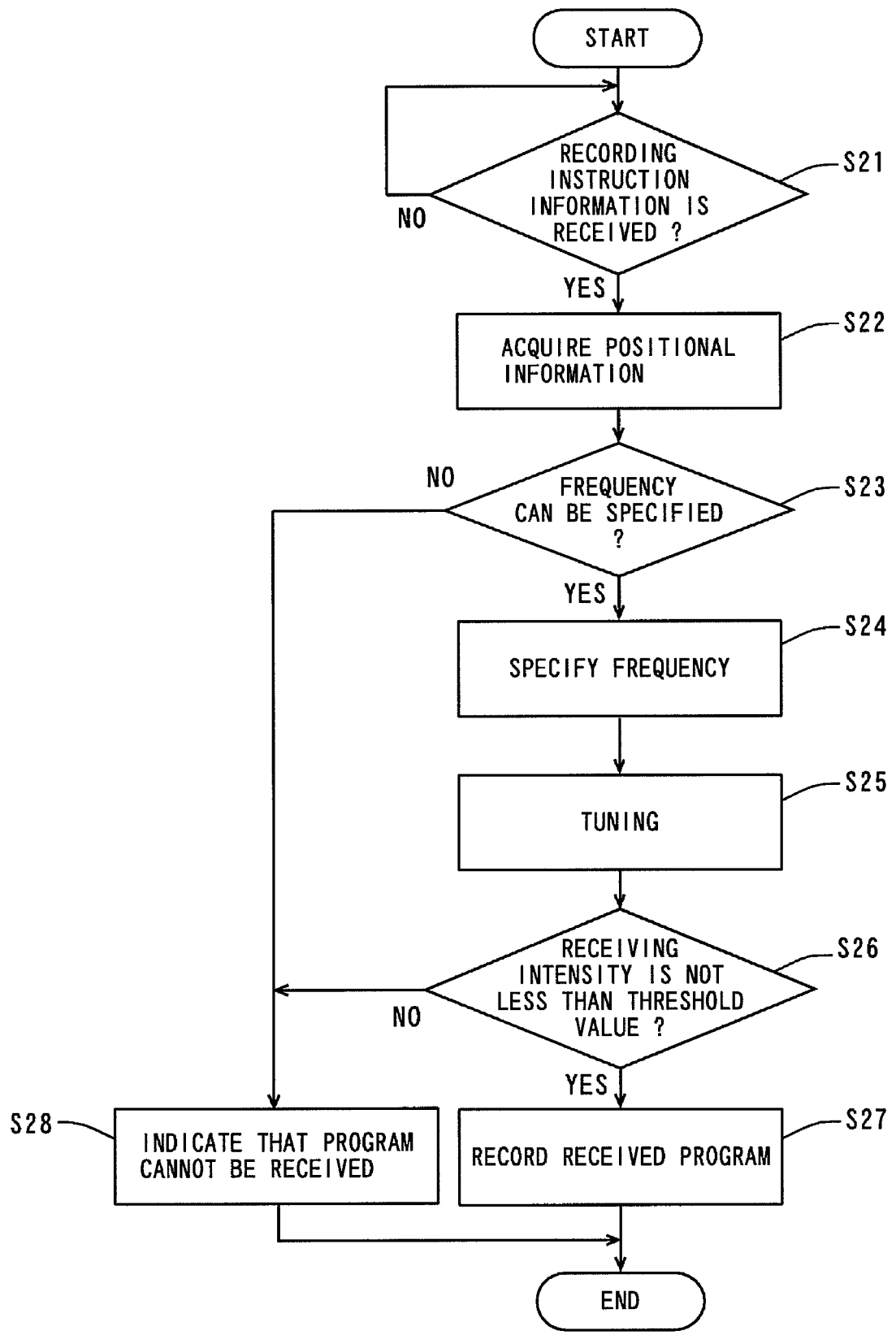
FIG. 6 is a flow chart showing a first example of control by a controller in a mobile communication device.

FIG. 5 is a flow chart showing the first example of control by the controller 17 in the digital broadcasting receiver 10. FIG. 6 is a flow chart showing the first example of control by the controller 46 in the mobile communication device 40.

FIG. 7 shows an example of a broadcasting schedule of programs. In FIG. 7, a reserved program is a live broadcast of baseball that is broadcast from 18:00 to 21:00 in a broadcasting station A, for example.

First, referring to FIGS. 2 and 5, the first example of control by the controller 17 in the digital broadcasting receiver 10 will be described.

The controller 17 causes the program recorder 12 to start to record the reserved program on the basis of timer recording information recorded on the timer recording information recorder 14 and time information from the timer 15 (step S1).

Then, the controller 17 determines whether or not the extension information extractor 13 extracts extension start information (step S2). Here, the extension start information is transmitted from the broadcasting station when a broadcast time period of the reserved program is determined to be extended, as described above. That is, the broadcast time period of the reserved program has already been determined to be extended when the extension information extractor 13 extracts the extension start information, while it has not been determined to be extended yet when the extension information extractor 13 does not extract the extension start information.

When the extension information extractor 13 extracts the extension start information, the controller 17 determines whether or not other program or programs is/are timer-recorded within an extended time period of the reserved program on the basis of the timer recording information recorded on the timer recording information recorder 14 (step S3).

When the other program or programs is/are timer-recorded, the controller 17 determines whether or not the total number of other programs that have been timer-recorded and reserved programs (hereinafter referred to as the number of requests for recording) is more than the number of tuners (step S4).

In the present embodiment, the digital broadcasting receiver 10 has the two tuners 11a and 11b, as described above. Therefore, the controller 17 determines that the number of requests for recording is more than the number of tuners if it is three or more, while determining that the number of requests for recording is not more than the number of tuners if it is two or less.

When the number of requests for recording is more than the number of tuners, the controller 17 causes the information transmitter 16 to transmit to the mobile communication device 40 recording instruction information relating to the reserved program (step S5). In this case, the recording instruction information includes the title of the reserved program and a broadcasting station at which the reserved program is broadcast. In the example shown in FIG. 7, when a drama at a broadcasting station B and a live broadcast of soccer at a broadcasting station a are timer-recorded in addition to the live broadcast of baseball, the controller 17 transmits to the mobile communication device 40 the recording instruction information relating to the reserved program. In this case, the recording instruction information includes the live broadcast of baseball as the program title, and includes the broadcasting station A as the broadcasting station.

Then, the controller 17 determines whether or not the current time is the scheduled termination time of broadcasting of the reserved program on the basis of the timer recording information recorded on the timer recording information recorder 14 and the time information from the timer 15 (step S6).

When the current time is the scheduled termination time of broadcasting of the reserved program, the controller 17 terminates the recording of the reserved program (step S7). At the same time, the controller 17 starts to record the other program. In the example shown in FIG. 7, the controller 17 terminates the recording of the live broadcast of baseball and starts to record the drama and the live broadcast of soccer.

On the other hand, when the extension start information is not extracted in the step S2, the controller 17 determines whether or not the current time is the scheduled termination time of broadcasting of the reserved program on the basis of the timer recording information recorded on the timer recording information recorder 14 and the time information from the timer 15 (step S8).

When the current time is the scheduled termination time of broadcasting of the reserved program, the controller 17 causes the program recorder 12 to terminate the recording of the reserved program (step S7). In the example shown in FIG. 7, the controller 17 terminates the recording of the live broadcast of baseball.

When the current time is not the scheduled termination time of broadcasting of the reserved program in the step S8, the controller 17 is returned to the processing in the step S2.

When no other program is timer-recorded in the step S3, the controller 17 causes the program recorder 12 to continue to record the reserved program even after the scheduled termination time of broadcasting of the reserved program (step S9). In the example shown in FIG. 7, when no other program is timer-recorded in addition to the live broadcast of baseball, the controller 17 continues to record the extended live broadcast of baseball.

Then, the controller 17 determines whether or not the extension information extractor 13 extracts the extension termination information relating to the reserved program (step S10).

When the extension information extractor 13 extracts the extension termination information relating to the reserved program, the controller 17 determines whether or not the current time is the termination time of broadcasting of the reserved program on the basis of the extension termination information relating to the reserved program and the time information from the timer 15 (step S11).

When the current time is the termination time of broadcasting of the reserved program, the controller 17 causes the program recorder 12 to terminate the recording of the reserved program (step S7). In the example shown in FIG. 7, the controller 17 terminates the recording of the live broadcast of baseball.

When the extension information extractor 13 does not extract the extension termination information relating to the reserved program in the step S10, the controller 17 repeats the determination in the step S10.

When the current time is not the termination time of broadcasting of the reserved program in the step S11, the controller 17 waits until the current time is the termination time of broadcasting of the reserved program.

When the number of requests for recording is not more than the number of tuners in the step S4, the controller 17 causes the program recorder 12 to continue to record the reserved program even after the scheduled termination time of broadcasting of the reserved program (step S12), and causes the program recorder 12 to start to record the other program on the basis of the recording reservation information and the time information (step S13). In the example shown in FIG. 7, when only the drama at the broadcasting station B is timer-recorded in addition to the live broadcast of baseball, the controller 17 continues to record the extended live broadcast of baseball and starts to record the drama.

Thereafter, the controller 17 terminates the recording of the reserved program through the processing in the steps S10 and S11 (step S7). In the example shown in FIG. 7, the controller 17 terminates the recording of the extended live broadcast of baseball, while continuing to record the drama.

When the current time is not the scheduled termination time of broadcasting of the reserved program in the step S6, the controller 17 waits until the current time is the scheduled termination time of broadcasting of the reserved program.

Then, referring to FIGS. 3 and 6, description is made of the control processing by the controller 46 in the mobile communication device 40.

First, the controller 46 determines whether or not the information receiver 43 receives recording instruction information (step S21). In the first example of control, the recording instruction information received by the information receiver 43 includes the title of a reserved program and a broadcasting station at which the reserved program is broadcast. In the example shown in FIG. 7, the recording instruction information includes a live broadcast of baseball as the program title, and includes the broadcasting station A as the broadcasting station.

When the recording instruction information is not received in the step S21, the controller 46 repeats the determination in the step S21.

When the recording instruction information is received, the controller 46 acquires positional information detected by the position detector 44 (step S22).

Then, the controller 46 determines whether or not a frequency for receiving a program designated by the recording instruction information can be specified on the basis of the positional information acquired from the position detector 44 and channel information recorded on the recorder 45 (step S23).

In this case, if the program designated by the recording instruction information is broadcast at the present location of the mobile communication device 40, a frequency for receiving a broadcasting signal corresponding to the program can be specified. Specifically, a region is specified from the positional information, and a channel at each of broadcasting stations in the specified region is specified from the channel information. This allows the frequency of the broadcasting station designated by the recording instruction information to be specified.

On the other hand, unless the program designated by the recording instruction information is broadcast at the present location of the mobile communication device 40, the frequency for receiving the broadcasting signal can not be specified.

In the example shown in FIG. 7, the broadcasting station designated by the recording instruction information is the broadcasting station A. In this case, if the mobile communication device 40 is positioned at the region a, for example, in the example shown in FIG. 4, the frequency (channel) can be specified as a frequency of Channel 3.

When the frequency can be specified in the step S23, the controller 46 specifies the frequency (step S24), and causes the broadcasting signal receiver 41 to tune in on the basis of the specified frequency (step S25).

When the mobile communication device 40 is positioned in a region other than the region recorded as the channel information, the user may tune in by specifying a frequency (a channel) using a key operation in place of the controller 46.

Then, the controller 46 determines whether or not a receiving intensity caused by the broadcasting signal receiver 41 is not less than a threshold value (step S26). For example, when the mobile communication device 50 is moving at high speed, or the mobile communication device 50 is in a place where electric waves do not penetrate, the receiving intensity caused by the broadcasting signal receiver 41 is reduced.

When the receiving intensity is not less than the threshold value, the broadcasting signal receiver 41 normally receives the broadcasting signal from the broadcasting station specified from the recording instruction information. In this case, the controller 46 records the received program (reserved program) on the recording medium 50 through the recording medium input/output unit 42 (step S27), and terminates the processing after the recording is terminated. In the example shown in FIG. 7, the controller 46 records the extended live broadcast of baseball.

On the other hand, when the frequency cannot be specified in the step S23, the controller 46 causes a display (not shown) in the mobile communication device 40 to indicate that the program designated by the recording instruction information cannot be received (step S28), to terminate the processing.

When the receiving intensity caused by the broadcasting signal receiver 41 is less than the threshold value in the step S26, the broadcasting signal receiver 41 does not normally receive the broadcasting signal from the broadcasting station specified from the recording instruction information. In this case, the controller 46 proceeds to the processing in the step S28.

As described in the foregoing, in the first example of control, when the number of requests for recording is more than the number of tuners by the extension of the broadcast time period of the reserved program, the recording instruction information relating to the reserved program is transmitted to the mobile communication device 40 from the digital broadcasting receiver 10, and the recording medium 50 in the mobile communication device 40 starts to record the reserved program. In this case, the program recorder 12 in the digital broadcasting receiver 10 records the other program. This allows the extended reserved program and the other program to be recorded until the end.

The recording of the reserved program by the recording medium 50 in the mobile communication device 40 may be started at the time of receiving the recording instruction information or at the start time of extension of the reserved program. The start time of recording of the reserved program by the recording medium 50 can be adjusted to the start time of extension of the reserved program by adding the start time of extension to the recording instruction information, for example.

Although in this example, the recording medium 50 in the mobile communication device 40 records the reserved program, and the program recorder 12 in the digital broadcasting receiver 10 records the other two programs, the program recorder 12 in the digital broadcasting receiver 10 may record one of the other two programs and the reserved program, and the recording medium 50 in the mobile communication device 40 may record the other of the other two programs. In the case, the controller 16 in the digital broadcasting receiver 10 causes the information transmitter 16 to transmit to the mobile communication device 40 the recording instruction information relating to the other of the other two programs and causes the program recorder 12 to continue to record the reserved program.

(1-2-2) Second Example of Control

In a second example of control, description is made of a case where a program whose broadcast time period may not be extended is timer-recorded as a reserved program. In FIG. 7, the reserved program is a variety show that is broadcast from 18:00 to 22:00 at a broadcasting station b, for example.

Figure 8:
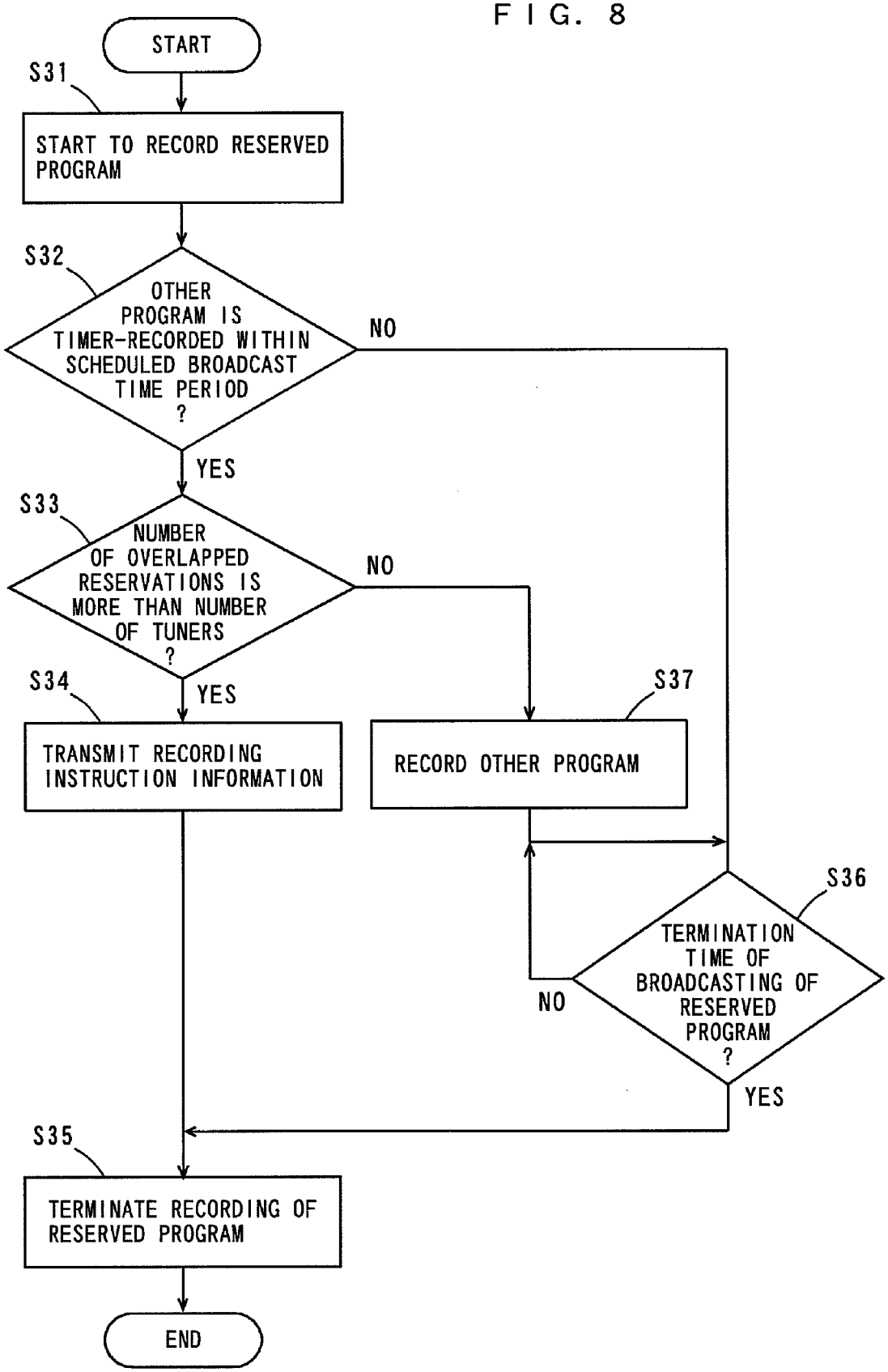
FIG. 8 is a flow chart showing a second example of control by a controller in a digital broadcasting receiver.

FIG. 8 is a flowchart showing the second example of control by the controller 17 in the digital broadcasting receiver 10.

Referring now to FIGS. 2 and 8, the second example of control by the controller 17 in the digital broadcasting receiver 10 will be described below.

First, the controller 17 causes the program recorder 12 to start to record a reserved program on the basis of timer recording information recorded on the timer recording information recorder 14 and time information from the timer (step S31). Then, the controller 17 determines whether or not other program or programs is/are timer-recorded within a scheduled broadcast time period of the reserved program on the basis of the timer recording information recorded on the timer recording information recorder 14 (step S32).

When the other program or programs is/are timer-recorded within the scheduled broadcast time period of the reserved program, the controller 17 determines whether or not the total number of other programs that have been timer-recorded and reserved programs (hereinafter referred to as the number of overlapped reservations) is more than the number of tuners (step S33). The number of tuners is two in the present embodiment, as described above.

When the number of overlapped reservations is more than the number of tuners, the controller 17 causes the information transmitter 16 to transmit to the mobile communication device 40 recording instruction information relating to the reserved program (step S34). In this case, the recording instruction information includes the title of the reserved program and a broadcasting station at which the reserved program is broadcast. In the example shown in FIG. 7, when a drama at a broadcasting station B and a live broadcast of soccer at a broadcasting station a are timer-recorded in addition to the variety show, the controller 17 transmits the recording instruction information to the mobile communication device 40. In this case, the recording instruction information includes the variety show as the program title, and includes the broadcasting station b as the broadcasting station.

The controller 17 causes the program recorder 12 to terminate the recording of the reserved program at the start time of broadcasting of the other program on the basis of the timer recording information and the time information (step S35). At the same time, the controller 17 causes the program recorder 12 to start to record the other program. In the example shown in FIG. 7, the controller 17 terminates the recording of the variety show and starts to record the drama.

On the other hand, when no other program is timer-recorded in the step S32, the controller 17 determines whether or not the current time is the scheduled termination time of broadcasting of the reserved program on the basis of the timer recording information recorded on the timer recording information recorder 14 and the time information from the timer 15 (step S36). In the example shown in FIG. 7, when only the variety show is timer-recorded, the controller 17 determines whether or not the current time is the scheduled termination time of broadcasting of the variety show.

When the current time is the scheduled termination time of broadcasting of the reserved program, the controller 17 causes the program recorder 12 to terminate the recording of the reserved program (step S35). In the example shown in FIG. 7, the controller 17 terminates the recording of the variety show.

When the current time is not the scheduled termination time of broadcasting of the reserved program in the step S36, the controller 17 waits until the current time is the scheduled termination time of broadcasting of the reserved program.

When the number of overlapped reservations is not more than the number of tuners in the step S33, the controller 17 causes the program recorder 12 to continue to record the reserved program and start to record the other program on the basis of the timer recording information and the time information (step S37). In the example shown in FIG. 7, when the drama at the broadcasting station B, for example, is timer-recorded in addition to the variety show, the controller 17 continues to record the variety show and starts to record the drama. Thereafter, the controller 17 proceeds to the processing in the step S36.

Control processing by the controller 46 in the mobile communication device 40 is the same as the control processing in the first example of control (see FIG. 6).

As described in the foregoing, in the second example of control, when the number of requests for recording is more than the number of tuners by timer-recording the other program or programs within the broadcast time period of the reserved program, the recording instruction information relating to the reserved program is transmitted to the mobile communication device 40 from the digital broadcasting receiver 10, so that the recording medium 50 in the mobile communication device 40 starts to record the reserved program. In this case, the program recorder 12 in the digital broadcasting receiver 10 records the other one program. This allows the reserved program and the other program to be recorded until the end.

Although in the second example of control, the recording of the reserved program by the program recorder 12 is terminated at the start time of broadcasting of the other program, the recording of the reserved program by the program recorder 12 may be terminated when the information transmitter 16 in the digital broadcasting receiver 10 transmits the recording instruction information.

Although in this example, the recording medium 50 in the mobile communication device 40 records the reserved program, and the program recorder 12 in the digital broadcasting receiver 10 records the other two programs, the program recorder 12 in the digital broadcasting receiver 10 records one of the other two programs and the reserved program, and the recording medium 50 in the mobile communication device 40 may record the other of the other two programs. In the case, the controller 16 in the digital broadcasting receiver 10 causes the information transmitter 16 to transmit to the mobile communication device 40 recording instruction information relating to the other of the other two programs and causes the program recorder 12 to continue to record the reserved program.

(1-2-3) Third Example of Control

In a third example of control, when the frequency cannot be specified in the step S23 shown in FIG. 6 or when the receiving intensity caused by the broadcasting signal receiver 41 is less than the threshold value in the step S26, the controller 46 in the mobile communication device 40 causes the information transmitter 48 to transmit impossible-to-receive information to the digital broadcasting receiver 10. Note that the processing in the step S28 shown in FIG. 6 need not be performed.

In this case, the controller 17 in the digital broadcasting receiver 10 causes the information transmitter 16 to transmit to the mobile communication device 40 recording instruction information relating to a reserved program in the step S11 shown in FIG. 6 or in the step S36 shown in FIG. 8, and then performs recording instruction information switching processing, described below.

Figure 9:
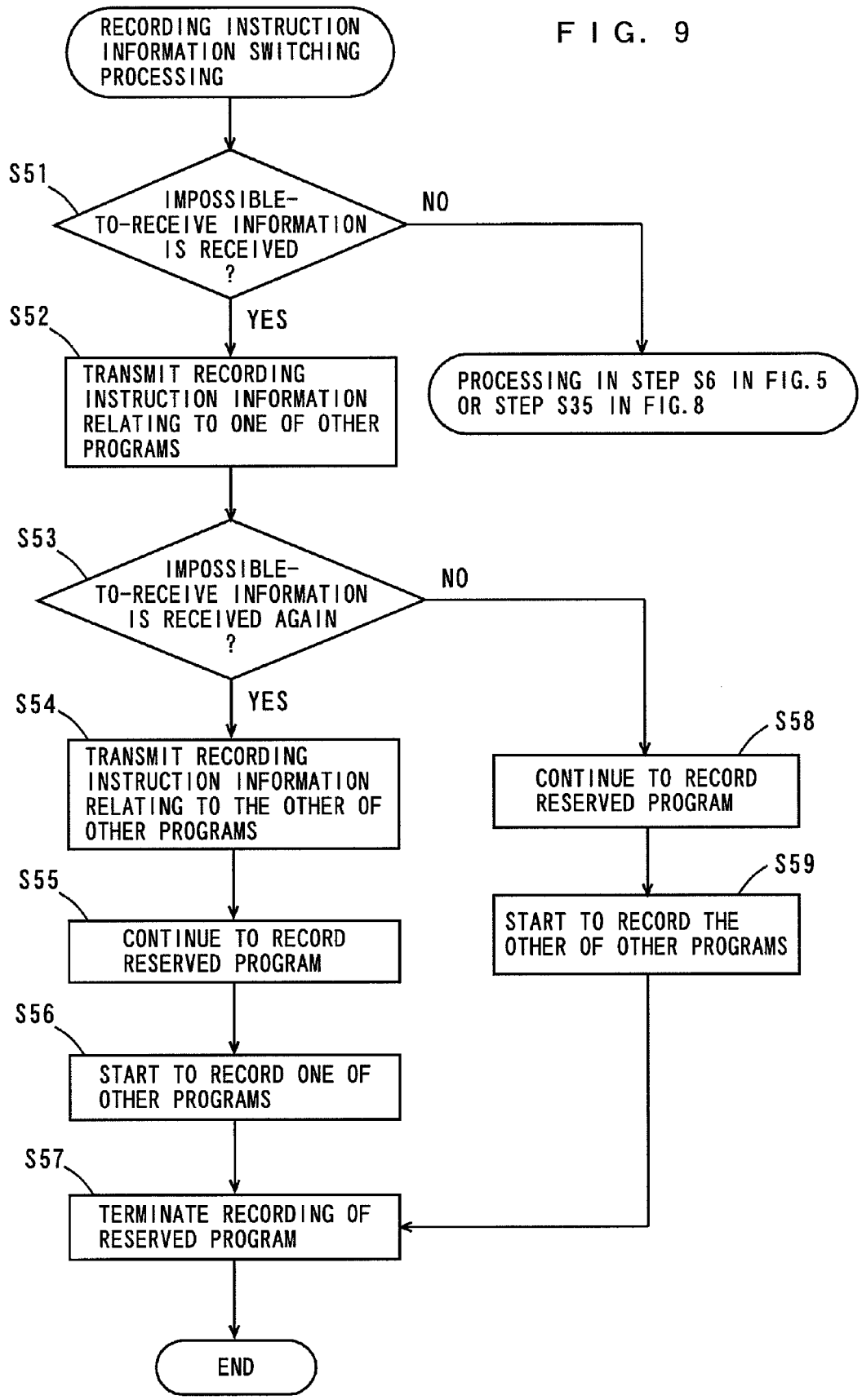
FIG. 9 is a flow chart showing recording instruction information switching processing by a controller in a digital broadcasting receiver.

FIG. 9 is a flow chart showing the recording instruction information switching processing performed by the controller 17 in the digital broadcasting receiver 10. Referring to FIGS. 2 and 9, the recording instruction information switching processing performed by the controller 17 in the digital broadcasting receiver 10 will be described below.

The controller 17 causes the information transmitter 16 to transmit to the mobile communication device 40 the recording instruction information relating to the reserved program in the step S11 shown in FIG. 6 or in the step S36 shown in FIG. 8, and then determines whether or not the information receiver 19 receives the impossible-to-receive information (step S51).

When the information receiver 19 receives the impossible-to-receive information, the information transmitter 16 transmits to the mobile communication device 40 recording instruction information relating to one of other programs (e.g., a drama at a broadcasting station B in FIG. 7) (step S52).

Then, the controller 17 determines whether or not the information receiver 19 receives the impossible-to-receive information again (step S53).

When the impossible-to-receive information is received again, the controller 46 causes the information transmitter 16 to transmit to the mobile communication device 40 recording instruction information relating to the other of the other programs (e.g., a live broadcast of soccer at a broadcasting station a in FIG. 7) (step S54).

Then, the controller 17 causes the program recorder 12 to continue to record an extended portion of the reserved program (step S55) and start to record one of the other programs (step S56).

Thereafter, the controller 17 causes the program recorder 12 to terminate the recording of the reserved program to fit with the termination time of broadcasting of the reserved program (step S57).

On the other hand, when the impossible-to-receive information is not received in the step S51, the controller 17 proceeds to the processing in the step S6 shown in FIG. 5 or the step S35 shown in FIG. 8. Even when the information receiver 19 does not receive the impossible-to-receive information, the controller 17 may repeat the determination in the step S51 for a predetermined time period.

When the impossible-to-receive information is not received in the step S53, the controller 17 causes the program recorder 12 to continue to record the reserved program (step S58) and start to record the other of the other programs (e.g., the live broadcast of soccer at the broadcasting station a in FIG. 7) on the basis of the timer recording information and the time information (step S59). Thereafter, the controller 17 proceeds to the processing in the step S57.

As described in the foregoing, in the third example of control, when the broadcasting signal receiver 41 in the mobile communication device 40 does not normally receive a broadcasting signal corresponding to the reserved program, the recording instruction information relating to the other program is transmitted from the digital broadcasting receiver 10 to the mobile communication device 40.

In this case, control processing by the controller 46 in the mobile communication device 40 (see FIGS. 6 and 9) is performed again. That is, the control processing by the controller 46 is performed in both a case where the digital broadcasting receiver 10 transmits the recording instruction information relating to the reserved program and a case where the digital broadcasting receiver 10 transmits the recording instruction information relating to the other program.

When the broadcasting signal receiver 41 can receive a broadcasting signal corresponding to at least one of the other programs even if it cannot receive the broadcasting signal corresponding to the reserved program, therefore, the recording medium 50 in the mobile communication device 40 records the other program. This allows the possibility that either one of the reserved program and the other program is not recorded to be reduced.

(1-3) Effects of First Embodiment

In the digital broadcasting receiving system 100 according to the first embodiment, when the number of programs that are requested to be recorded is more than the number of tuners by the extension of the broadcast time period of the program that has been timer-recorded, the recording instruction information relating to one of the programs is transmitted to the mobile communication device 40 from the digital broadcasting receiver 10, so that the recording medium 50 in the mobile communication device 40 records the one program. In this case, the program recorder 12 in the digital broadcasting receiver 10 records the other program. This allows the extended program and the other program to be recorded until the end.

When the number of requests for recording is more than the number of tuners by timer-recording the other program or programs within the broadcast time period of the program that has been timer-recorded, the recording instruction information relating to the one program is transmitted to the mobile communication device 40 from the digital broadcasting receiver 10, so that the recording medium 50 in the mobile communication device 40 records the one program. In this case, the program recorder 12 in the digital broadcasting receiver 10 records the other program. This allows the plurality of programs to be recorded until the end.

(2) Second Embodiment (2-1) Configuration of Digital Broadcasting Receiver

The configuration of a digital broadcasting receiving system 100 according to a second embodiment will be described. The digital broadcasting receiving system 100 according to the second embodiment includes a digital broadcasting receiver 10B, described below, in place of the digital broadcasting receiver 10.

Figure 10:
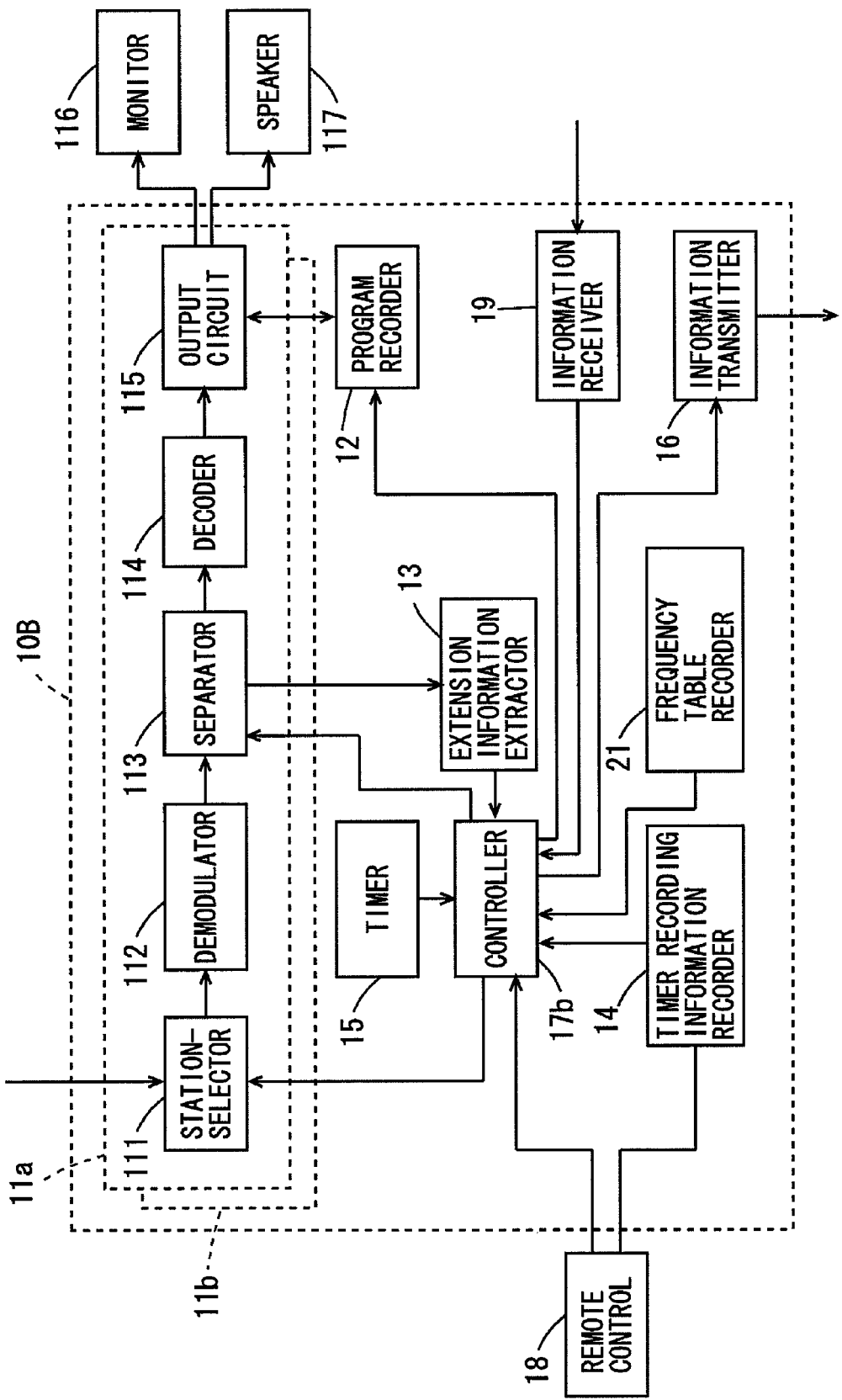
FIG. 10 is a block diagram showing the configuration of a digital broadcasting receiver in a digital broadcasting receiving system according to a second embodiment.

FIG. 10 is a block diagram showing the configuration of the digital broadcasting receiver 10B in the digital broadcasting receiving system 100. In the configuration of the digital broadcasting receiver 10B, the difference from the digital broadcasting receiver 10 shown in FIG. 2 will be described below.

As shown in FIG. 10, the digital broadcasting receiver 10B includes a frequency table recorder 21 in addition to the components constituting the digital broadcasting receiver 10 (FIG. 2). Further, the digital broadcasting receiver 10B includes a controller 17b in place of the controller 17 (FIG. 2).

A frequency table indicating channels at each of broadcasting stations in a plurality of regions (e.g., all over Japan) is recorded on the frequency table recorder 21.

FIG. 11 shows an example of the frequency table. FIG. 11 shows that a channel corresponding to a broadcasting signal from a broadcasting station A, for example, is Channel 3 in a region a and Channel 34 in a region b. Further, in a region e, programs at the broadcasting station A are not broadcast, so that a broadcasting signal from the broadcasting station A cannot be received. A predetermined center frequency is assigned to each of the channels, as described above.

The controller 17*b* controls each of the components constituting the digital broadcasting receiver 10B. The details of control processing by the controller 17*b* will be described later.

The configuration of a mobile communication device 40 used in the present embodiment is the same as that of the mobile communication device 40 shown in FIG. 3. However, control processing by a controller 46 differs from that in the first embodiment. The control processing by the controller 46 will be described later. Note that in the mobile communication device 40 used in the present embodiment, the recorder 45 (FIG. 3) need not be provided.

(2-2) Control Processing at the Time of Recording

Control processing by the digital broadcasting receiving system 100 according to the second embodiment in recording a reserved program will be then described.

First, as to the control processing by the controller 17*b* in the digital broadcasting receiver 10B, the difference from the control processing by the controller 17 in the digital broadcasting receiver 10 (FIG. 2) will be described.

When the number of requests for recording is more than the number of tuners by the extension of a broadcast time period of the reserved program or when the number of requests for recording is more than the number of tuners by timer-recording other program or programs within the broadcast time period of the reserved program, the controller 17*b* generates frequency information relating to the reserved program on the basis of the frequency table recorded on the frequency table recorder 21 and transmits to the mobile communication device 40 recording instruction information relating to the reserved program including the frequency information.

The frequency information includes regions where a program is broadcast and respective channels in the regions. For example, in FIG. 11, frequency information relating to a program at a broadcasting station A includes regions a to d as regions where the program is broadcast, and respective channels in the regions include Channel 3 in the region a, Channel 34 in the region b, Channel 5 in the region c, and Channel 7 in the region d.

As to the control processing by the controller 46 in the mobile communication device 40 used in the present embodiment, the difference from the control processing by the controller 46 in the mobile communication device 40 in the first embodiment will be then described.

The controller 46 determines whether or not a frequency for receiving a program designated by recording instruction information can be specified (see step S23 in FIG. 6) and specifies the frequency (see step S24 in FIG. 6) on the basis of positional information acquired from the position detector 44 (FIG. 3) and the frequency information included in the recording instruction information.

In this case, it is possible to specify the frequency for receiving the program if a region where the mobile communication device 40 is currently positioned is included in the frequency information, while not specifying the frequency for receiving the program if it is not included in the frequency information.

Furthermore, when the region where the mobile communication device 40 is currently positioned is included in the frequency information, the frequency can be specified by selecting the channel corresponding to the region where the mobile communication device 40 is currently positioned out of the channels designated by the frequency information.

(2-3) Effects of Second Embodiment

In the second embodiment, when the number of programs that are requested to be recorded is more than the number of tuners by the extension of the broadcast time period of the program that has been timer-recorded or when the number of requests for recording is more than the number of tuners by timer-recording the other program or programs within the broadcast time period of the program that has been timer-recorded, the frequency information is generated on the basis of the frequency table recorded on the frequency table recorder 21 in the digital broadcasting receiver 10B, and the recording instruction information including the frequency information is transmitted to the mobile communication device 40.

In this case, in the mobile communication device 40, the frequency of the program designated by the recording instruction information can be easily specified on the basis of the frequency information. This causes a time period elapsed from the time when the recording instruction information is received until the recording of the program designated by the recording instruction information is started to be shortened.

Furthermore, as the frequency table recorder 21 in the second embodiment, the configuration of the existing digital broadcasting receiver can be utilized as it is, so that the recording can be quickly performed easily and at low cost.

Furthermore, even if the mobile communication device 40 exists in a region other than the region recorded as the channel information, the frequency of the program designated by the recording instruction information can be automatically specified by the controller 46.

This allows the recording to be quickly performed while reducing the capacity of the recorder 45 in the mobile communication device 40.

(3) Third Embodiment (3-1) Configuration of Digital Broadcasting Receiver

The configuration of a digital broadcasting receiving system 100 according to a third embodiment will be described. The digital broadcasting receiving system 100 according to the third embodiment includes a digital broadcasting receiver 10C, described below, in place of the digital broadcasting receiver 10 shown in FIG. 1.

Figure 12:
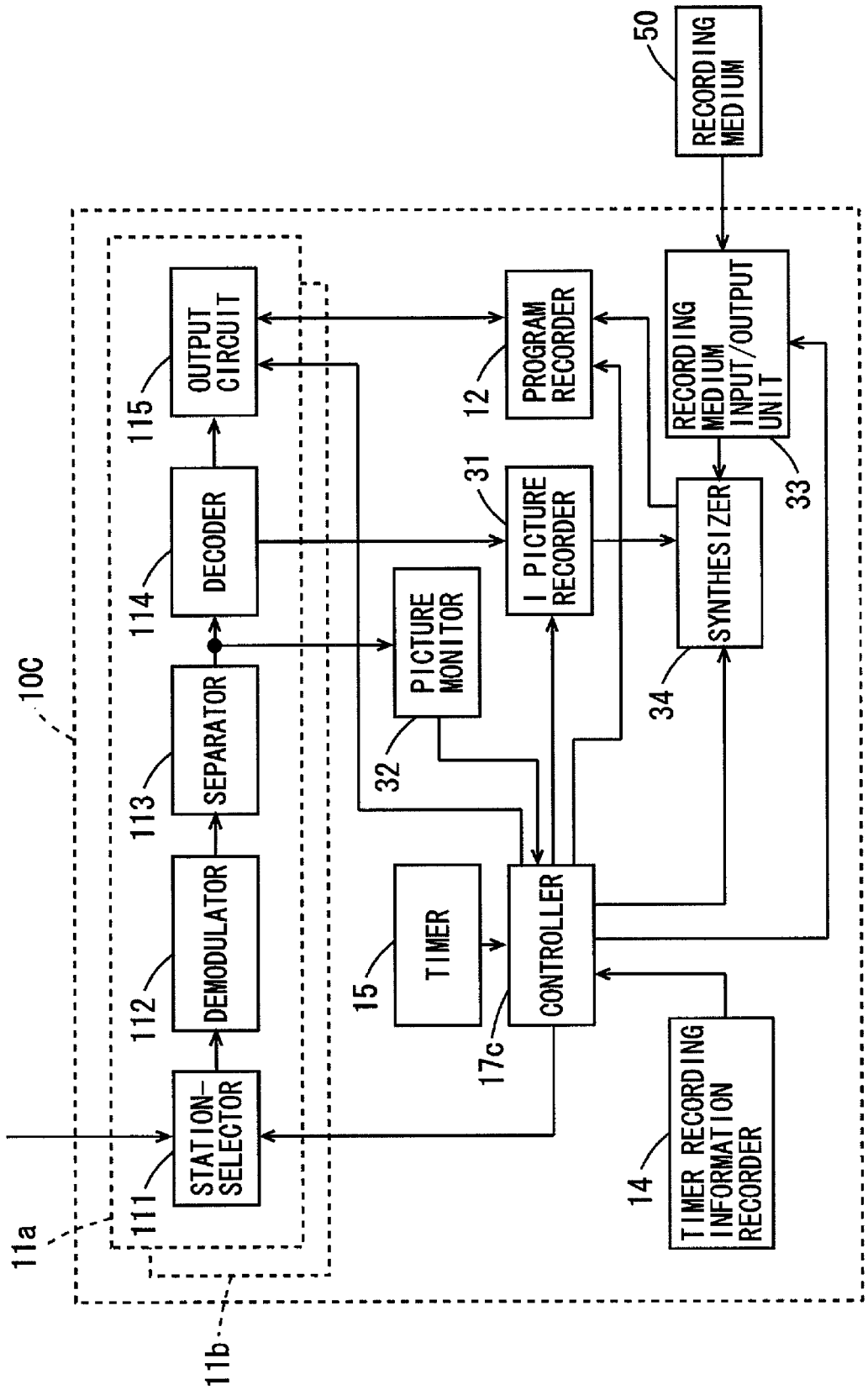
FIG. 12 is a block diagram showing the detailed configuration of a digital broadcasting receiver according to a third embodiment.

FIG. 12 is a block diagram showing the detailed configuration of the digital broadcasting receiver 10C. In the configuration of the digital broadcasting receiver 10C, the difference from the digital broadcasting receiver 10 shown in FIG. 2 will be described below.

As shown in FIG. 12, the digital broadcasting receiver 10C includes an I picture recorder 31, a picture monitor 32, a recording medium input/output unit 33, and a synthesizer 34 in addition to components constituting the digital broadcasting receiver 10 shown in FIG. 2. Further, the digital broadcasting receiver 10C includes a controller 17*c* in place of the controller 17 shown in FIG. 2. In FIG. 12, the illustration of the extension information extractor 13, the information transmitter 16, and the information receiver 19 shown in FIG. 2 is omitted.

The I picture recorder 31 records a B picture, a P picture, and an I picture that are included in video data outputted from a decoder 114. The details will be described later. Note that the I picture recorder 31 may be integral with a program recorder 12. In this case, the program recorder 12 records the above-mentioned I picture.

The picture monitor 32 detects the picture type of each of pictures included in a video stream outputted from a separator 113.

The recording medium input/output unit 33 inputs and outputs program data (including voice data and video data) recorded on a recording medium 50 in a mobile communication device 40 as shown in FIG. 1. Although in the present embodiment, program data within the recording medium 50 is inputted to the digital broadcasting receiver 10 by connecting the recording medium 50 taken out of the mobile communication device 40 to the digital broadcasting receiver 1C, the program data within the recording medium 50 in the mobile communication device 40 may be transmitted to the digital broadcasting receiver 10 through a communication medium such as a network.

The synthesizer 34 corrects the program data inputted through the recording medium input/output unit 33 using the I picture recorded on the I picture recorder 31 and couples the corrected program data to the program data recorded on the program recorder 12. The details will be described later.

Furthermore, the controller 17c performs the same control processing as that by the controller 17 shown in FIG. 2, and controls the program recorder 12, the I picture recorder 31, the recording medium input/output unit 33, and the synthesizer 34. The details of control processing by the controller 17C will be described later.

(3-2) Control Processing at the Time of Recording

The control processing by the controller 17c in the digital broadcasting receiver 10C in recording a reserved program will be then described. Control processing by the controller 46 in the mobile communication device 40 is the same as that in the first embodiment (see FIG. 6).

The controller 17c performs the same processing as the controller 17 (see FIGS. 5, 8, and 9) and performs program sampling processing, described below.

In the first or second example of control shown in FIG. 5 or 8, the program sampling processing is performed in a time period elapsed from the time when the information transmitter 16 (FIG. 2) transmits the recording instruction information relating to the reserved program until the broadcast time period of the reserved program is terminated. That is, the program sampling processing is performed after the processing in the step S5 in the first example of control shown in FIG. 5, while being performed after the processing in the step S34 in the second example of control shown in FIG. 8.

On the other hand, in the third example of control shown in FIG. 9, the program sampling processing is performed when the information receiver 19 does not receive an impossible-to-receive signal, and is performed in a time period elapsed from the time when the information transmitter 16 transmits recording instruction information relating to the reserved program or other program or programs until the termination time of broadcasting of the reserved program or the other program is terminated.

(3-2-1) Control at the Time of Program Sampling Processing

FIG. 13 is a flow chart showing the program sampling processing by the controller 17c.

Referring now to FIGS. 12 and 13, the program sampling processing by the controller 17c will be described below. In the following description, when the number of requests for recording is more than the number of tuners, a program recorded by the program recorder 12 in the digital broadcasting receiver 10C is taken as the other program, and a program recorded by the recorder 58 in the mobile communication device 40 (FIG. 3) is taken as a reserved program.

First, the controller 17c performs I picture monitoring processing for the reserved program (step S91). The I picture monitoring processing will be described later.

Then, the controller 17c determines whether or not the current time is the start time of broadcasting of the other program on the basis of timer recording information recorded on the timer recording information recorder 14 and time information from the timer 15 (step S92).

When the current time is not the start time of broadcasting of the other program in the step S92, the controller 17c repeats the determination in the step S92.

When the current time is the start time of broadcasting of the other program, the controller 17c performs I picture acquisition processing (step S93), to terminate the processing. The I picture acquisition processing will be described later.

Figure 14:
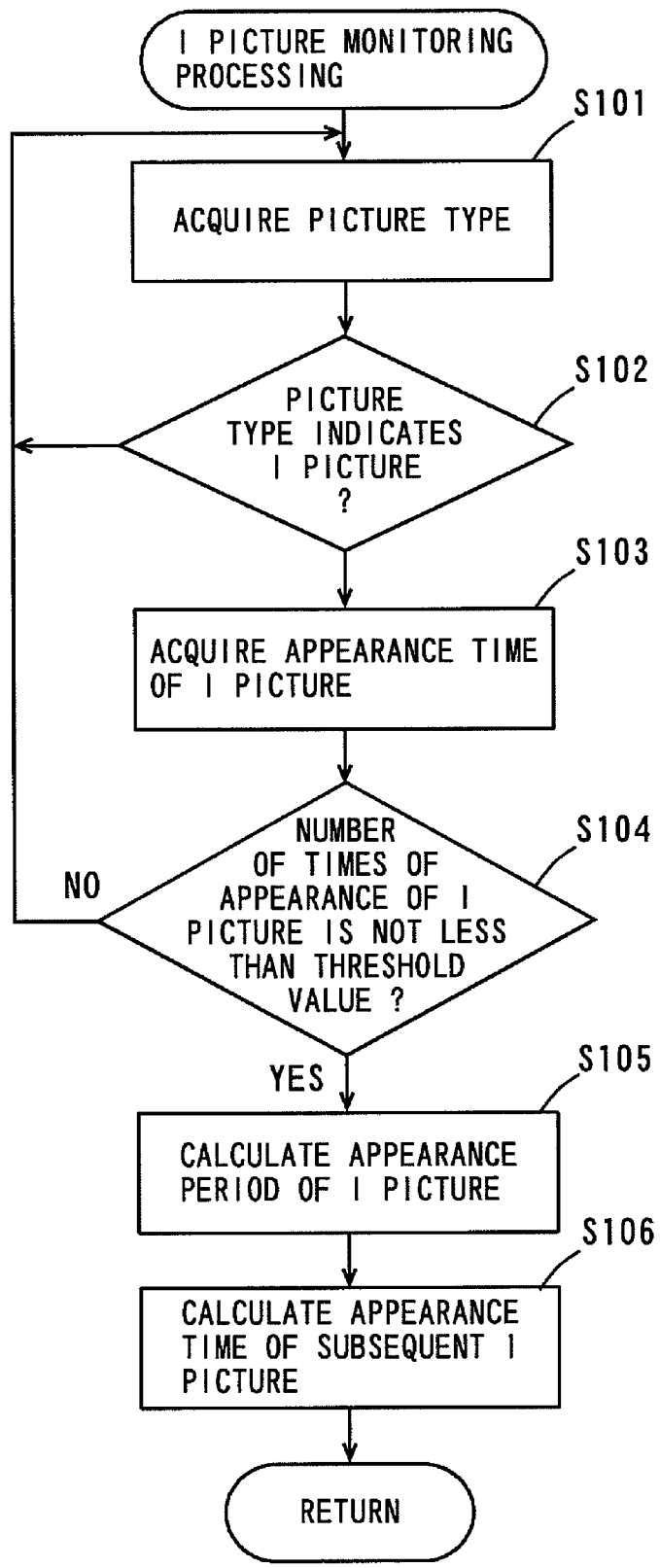
FIG. 14 is a flow chart showing I picture monitoring processing by a controller.

Here, the above-mentioned I picture monitoring processing will be described while referring to FIGS. 12 and 14. In a time period during which the I picture monitoring processing is performed, the reserved program is tuned in to. FIG. 14 is a flow chart showing the I picture monitoring processing by the controller 17c.

First, the controller 17c acquires the picture type detected by the picture monitor 32 (step S101).

Then, the controller 17c determines whether or not the acquired picture type indicates the I picture (step S102).

When the acquired picture type does not indicate the I picture in the step S102, the controller 17c is returned to the processing in the step S101.

When the acquired picture type indicates the I picture, the controller 17c acquires the appearance time of the I picture on the basis of the time information from the timer 15 (step S103).

Then, the controller 17c determines whether or not the number of times of appearance of the I picture is not less than a threshold value in a time period elapsed from the time when the I picture monitoring processing is started until the current time (step S104).

Unless the number of times of appearance of the I picture is not less than the threshold value in the step S104, the controller 17c is returned to the processing in the step S101.

When the number of times of appearance of the I picture is not less than the threshold value, the controller 17c calculates the appearance period of the I picture on the basis of a plurality of appearance times of the I picture that have been acquired (step S105).

Then, the controller 17c calculates, on the basis of the plurality of appearance times of the I picture and the calculated appearance period of the I picture, the subsequent appearance times of the I picture (step S106), to terminate the I picture monitoring processing.

The appearance time of the I picture in the reserved program is thus calculated by the I picture monitoring processing. The I picture acquisition processing is performed using the calculated appearance time of the I picture.

Figure 15:
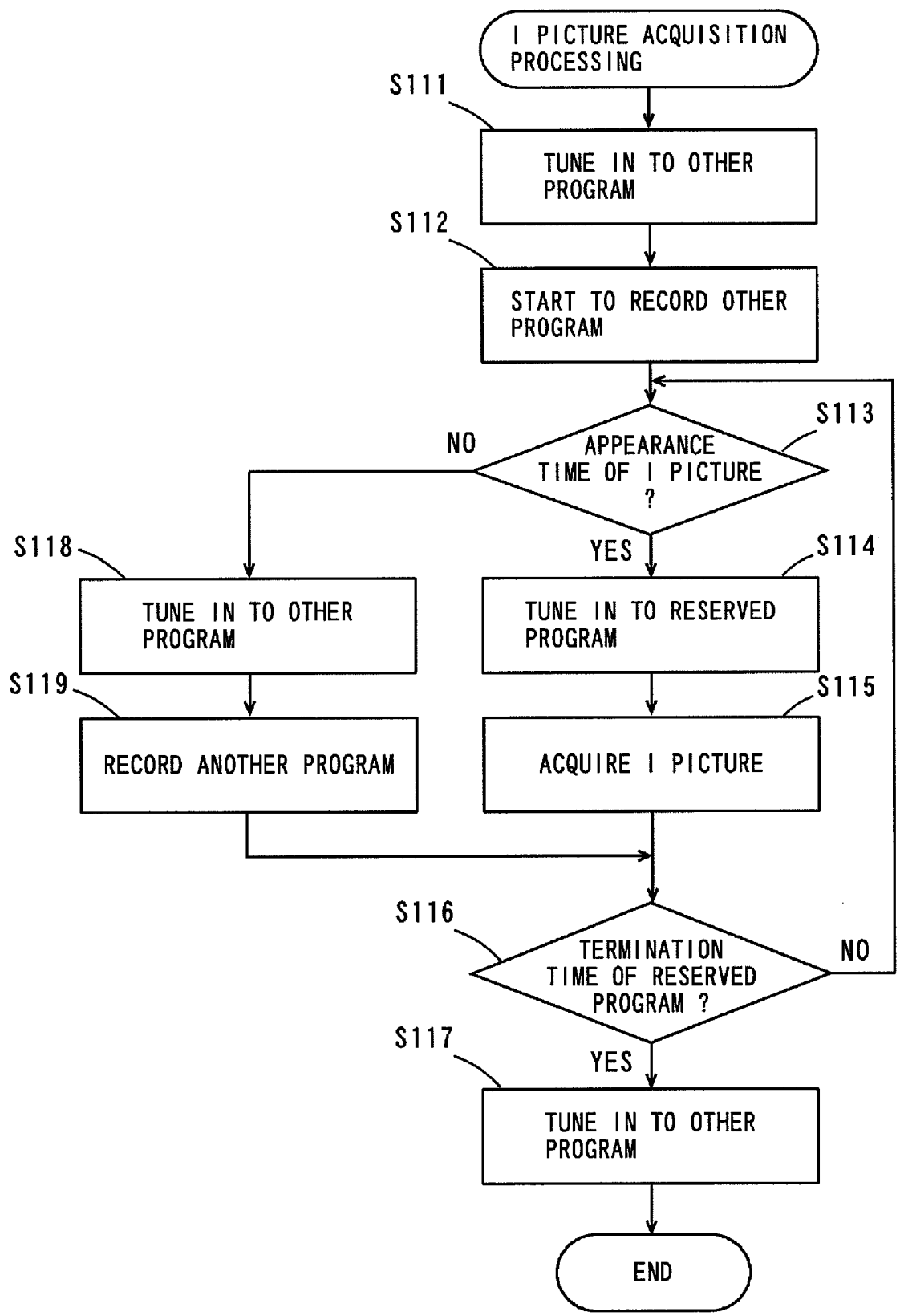
FIG. 15 is a flow chart showing I picture acquisition processing by a controller.

The above-mentioned I picture acquisition processing will be described below while referring to FIGS. 12 and 15. FIG. 15 is a flow chart showing the I picture acquisition processing by the controller 17c.

First, the controller 17c causes a station selector 111 to tune in to the other program (step S111), and causes the program recorder 12 to start to record the other program (step S112).

Then, the controller 17c determines whether or not the current time is the appearance time of the I picture in the reserved program on the basis of the time information from the timer 15 (step S113).

When the current time is the appearance time of the I picture in the reserved program, the controller 17c causes the station selector 111 to tune in to the reserved program (step S114), and causes the I picture recorder 31 to record the I picture in the reserved program (step S115).

Then, the controller 17 determines whether or not the current time is the termination time of broadcasting of the reserved program (step S116). When the broadcast time period of the reserved program is extended, as described above, the termination time of broadcasting of the reserved program is determined on the basis of extension termination information extracted by the extension information extractor (FIG. 2). On the other hand, when the broadcast time period of the reserved program is not extended, the termination time of broadcasting of the reserved program is determined on the basis of the timer recording information recorded on the timer recording information recorder 14.

When the current time is the termination time of broadcasting of the reserved program, the controller 17c tunes in to the other program (step S117), to terminate the processing.

On the other hand, when the current time is not the appearance time of the I picture in the reserved program in the step S113, the controller 17c causes the station selector 111 to tune into the other program (step S118), and causes the program recorder 12 to record the other program (step S119). Thereafter, the controller 17 proceeds to the processing in the step S116.

When the current time is not the termination time of broadcasting of the reserved program in the step S116, the controller 17 is returned to the processing in the step S113.

(3-2-2) Tuning State at the Time of Program Sampling Processing

Figure 16:
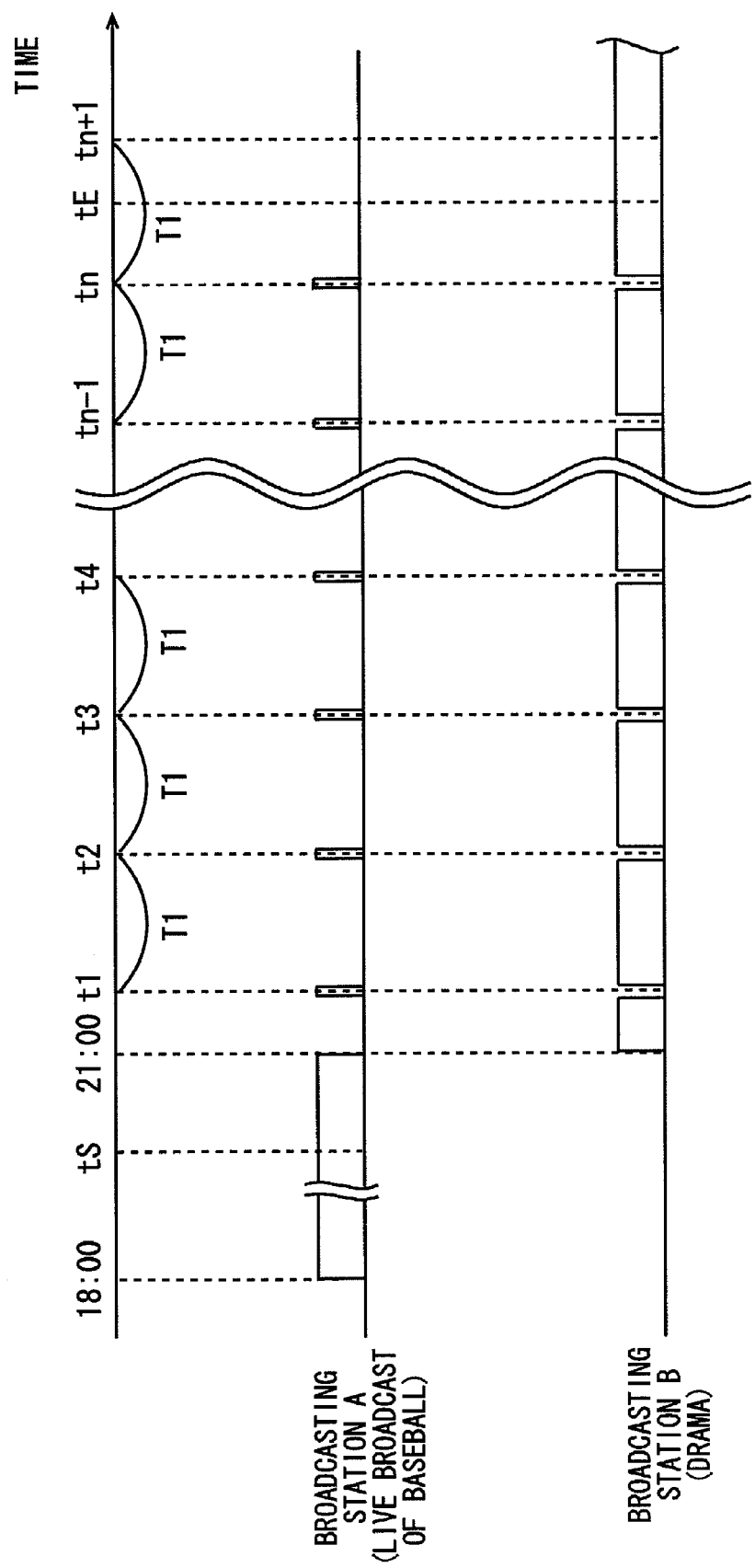
FIG. 16 is a timing chart for explaining a tuning state at the time of program sampling processing.

A tuning state of the station selector 111 (FIG. 12) at the time of the above-mentioned program sampling processing will be then described in detail using FIG. 16.

FIG. 16 is a timing chart for explaining the tuning state at the time of the program sampling processing. In FIG. 16, the horizontal axis indicates time, and a state where the station selector 111 tunes in is indicated at a high level, while a state where the station selector 111 tunes in is indicated at a low level.

Description is herein made of a case where in a broadcasting schedule shown in FIG. 7, a live broadcast of baseball at a broadcasting station A is timer-recorded as a reserved program, a drama at a broadcasting station B is timer-recorded as the other program, and a broadcast time period of the live broadcast of baseball is extended.

As shown in FIG. 16, a broadcasting signal from the broadcasting station A is first tuned in to within a scheduled broadcast time period of the live broadcast of baseball (18:00 to 21:00). Here, at the time tS before the scheduled termination time of broadcasting of the live broadcast of baseball (21:00), extension start information is transmitted from the broadcasting station A. In this case, the above-mentioned I picture monitoring processing is performed from the time tS to 21:00. Thus, the appearance period T1 of the I picture in the live broadcast of baseball and the appearance times t1, t2, t3, t4, . . . , tn−1, tn, tn+1, . . . of the I picture are calculated.

Then, in an extended time period of the live broadcast of baseball, i.e., a time period elapsed from 21:00 until the broadcasting of the live broadcast of baseball is terminated, the above-mentioned I picture acquisition processing is performed. The termination time of broadcasting of the live broadcast of baseball is determined on the basis of the extension termination information transmitted from the broadcasting station, as described above. In the example shown in FIG. 16, the termination time of broadcasting of the live broadcast of baseball is the time tE between the time tn and the time tn+1.

In this case, the broadcasting signal from the broadcasting station A is tuned in to at the appearance times t1, t2, t3, t4, . . . , tn−1, tn of the I picture in the live broadcast of baseball, and a broadcasting signal from the broadcasting station B is tuned in to in a time period other than the appearance time of the I picture. After the broadcasting of the live broadcast of baseball is terminated, the broadcasting signal from the broadcasting station B is turned in to.

The reserved program and the other program are turned in to at suitable timing on the basis of the previously calculated appearance time of the I picture in the reserved program. Therefore, the program recorder 12 can record program data relating to the other program while the I picture recorder 31 records the I picture in the reserved program.

(3-3) Synthesis Processing

Video data relating to a program recorded by the recording medium 50 in the mobile communication device 40 (hereinafter referred to as moving recording video data) is obtained on the basis of a one-segment broadcasting signal, and the amount of the data is less than that of video data relating to a program recorded in the digital broadcasting receiver 10 (hereinafter referred to as main body recording video data). Therefore, the image quality of a video obtained on the basis of the moving recording video data is inferior to the image quality of a video obtained on the basis of the main body recording video data.

Therefore, in the third embodiment, the moving recording video data relating to the reserved program is corrected using the I picture, in the reserved program, obtained by the above-mentioned I picture acquisition processing. This allows the image quality of the video obtained on the basis of the moving recording video data relating to the reserved program to be improved.

Figure 17:
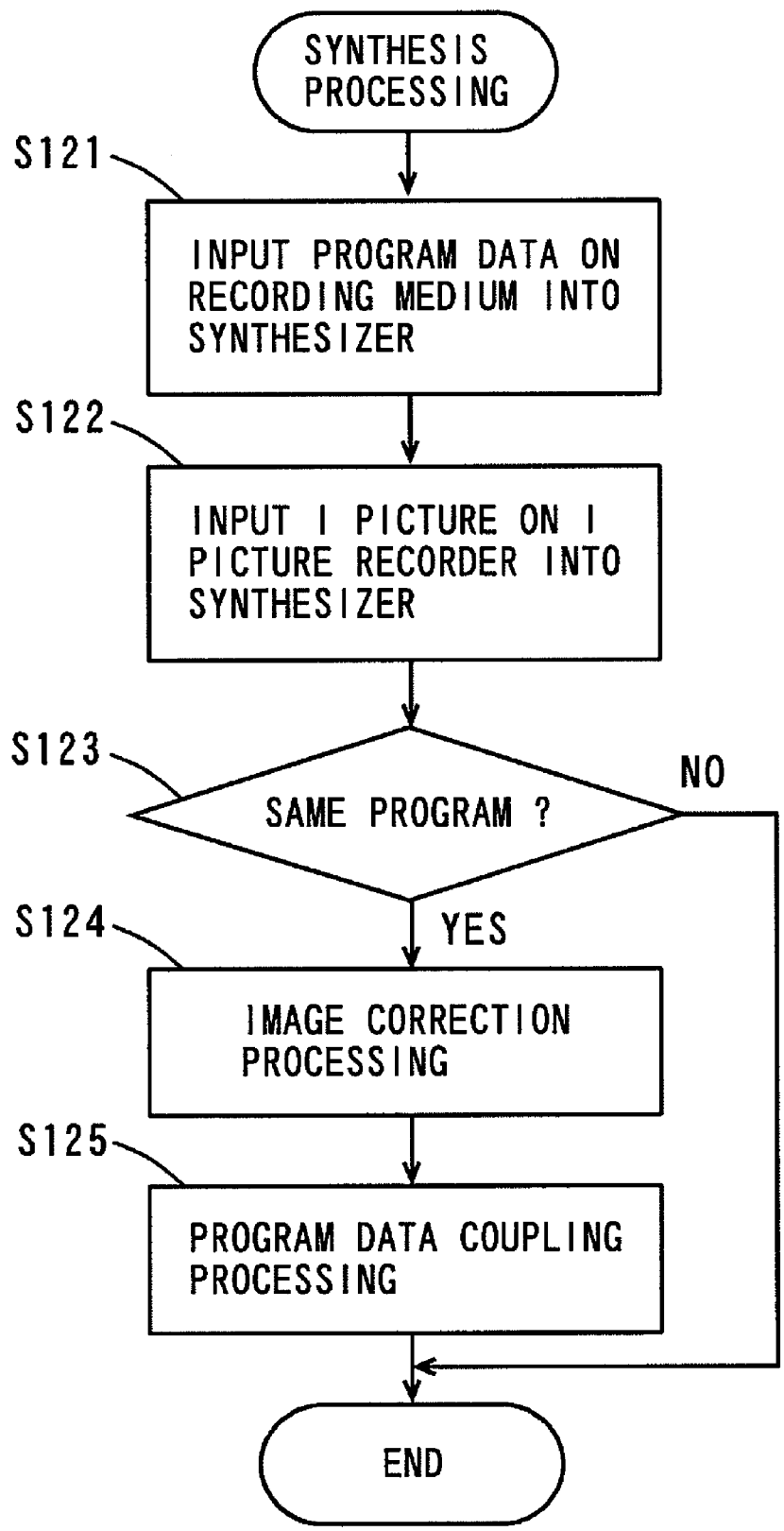
FIG. 17 is a flowchart showing synthesis program by a controller.

FIG. 17 is a flow chart showing the synthesis processing by the controller 17c. Referring now to FIGS. 12 and 17, the synthesis processing by the controller 17c will be described below.

First, the controller 17c inputs the program data recorded on the recording medium 50 to the synthesizer 34 through the recording medium input/output unit 33 (step S121).

Then, the controller 17c inputs the I picture recorded on the I picture recorder 31 to the synthesizer 34 (step S122).

Then, the controller 17c determines whether or not the program data from the recording medium input/output unit 33 and the I picture from the I picture recorder 31 correspond to the same program (reserved program) (step S123). Specifically, it is possible to specify, on the basis of a broadcasting identifier included in a broadcasting signal corresponding to each of programs, which of the programs corresponds to various types of data obtained from the broadcasting signal. This makes it possible to determine whether or not the program data from the recording medium input/output unit 33 and the I picture from the I picture recorder 31 correspond to the same program.

When the program data from the recording medium input/output unit 33 and the I picture from the I picture recorder 31 correspond to the same program (reserved program), the controller 17c causes the synthesizer 34 to perform image correction processing for the moving recording video data relating to the reserved program (step S124), to correct the moving recording video data relating to the reserved program. A specific example of the image correction processing will be described later.

Then, the controller 17c causes the synthesizer 34 to perform program data coupling processing for the reserved program (step S125), to couple the program data relating to the reserved program recorded on the recording medium 50 and the program data relating to the reserved program recorded on the program recorder 12. Thereafter, the controller 17 terminates the synthesis processing. The details of the program data coupling processing will be described later.

When the program data outputted from the recording medium input/output unit 33 and the I picture outputted from the I picture recorder 31 do not correspond to the same program in the step S123, the controller 17c terminates the synthesis processing.

(3-3-1) Image Correction Processing

Image correction processing for the moving recording video data will be then described.

Figure 18:
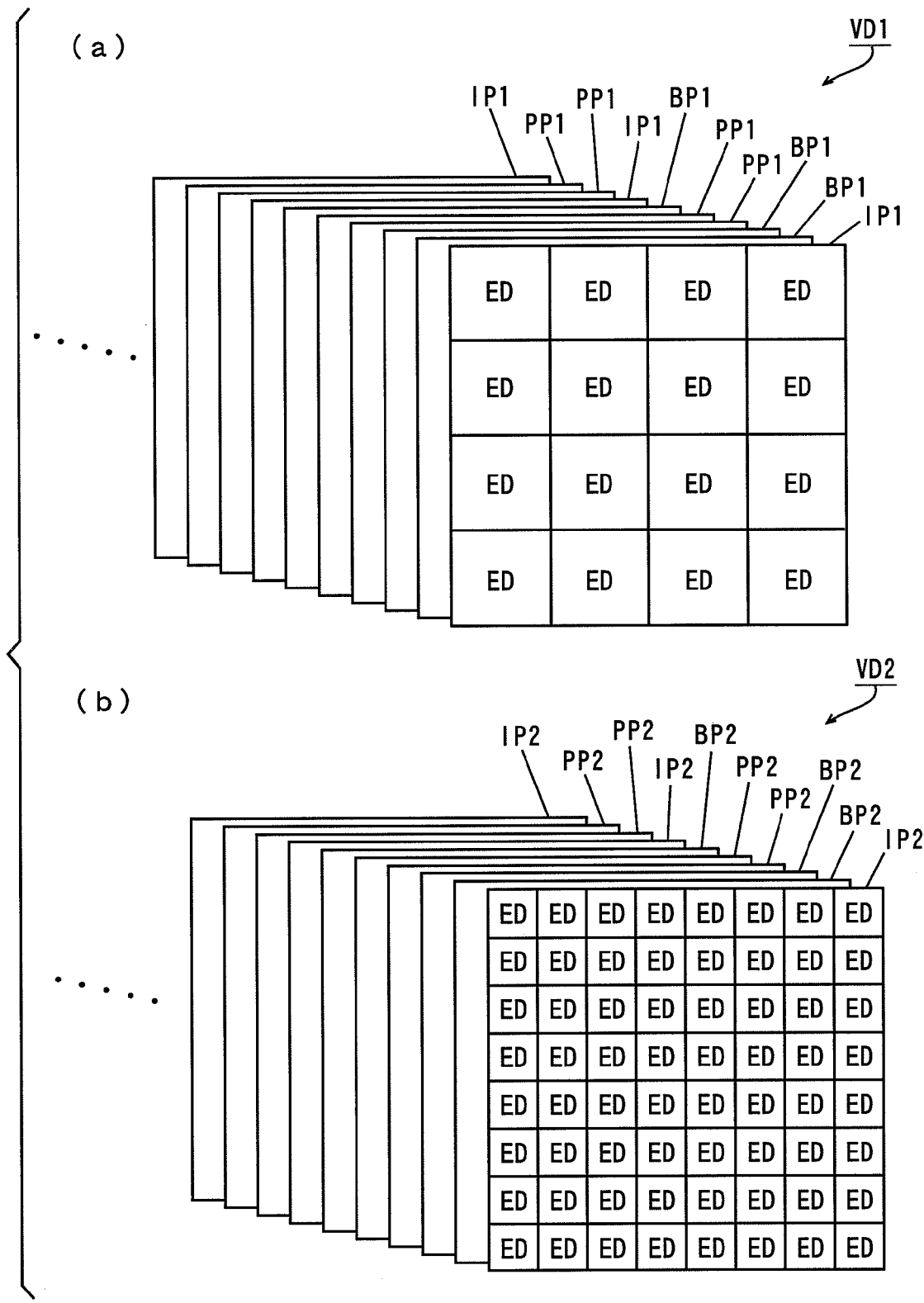
FIG. 18 is a schematic view for explaining the configuration of moving recording video data and main body recording video data.

First, the respective structures of the moving recording video data and the main body recording data will be described. FIG. 18 is a schematic view for explaining the structures of moving recording video data and the main body recording video data.

As shown in FIG. 18 (a), a moving recording video data VD1 includes a plurality of I pictures IP1, a plurality of P pictures PP1, and a plurality of B pictures BP1. Further, each of the I pictures IP1, the P pictures PP1, and the B pictures BP1 is composed of a predetermined number of pixel data ED. Each of the pixel data is composed of an R (Red) signal, a G (Green) signal, and a B (Blue) signal for color display.

As shown in FIG. 18 (b), a main body recording video data VD2 includes a plurality of I pictures IP2, a plurality of P pictures PP2, and a plurality of B pictures BP2. Further, each of the I pictures IP2, the P pictures PP2, and the B pictures BP2 is composed of a predetermined number of pixel data ED. Each of the pixel data ED is composed of an R (Red) signal, a G (Green) signal, and a B (Blue) signal for color display.

The number of pixel data ED (hereinafter referred to as the number of pixels) composing each of the pictures (including the I pictures IP1, the P pictures PP1, and the B pictures BP1) composing the moving recording video data VD1 is less than the number of pixels composing each of the pictures (including the I pictures IP2, the P pictures PP2, and the B pictures BP2) composing the main body recording video data VD2.

In this case, the image quality of a video obtained on the basis of the moving recording video data VD1 is inferior to the image quality of a video obtained on the basis of the main body recording video data VD2, as described above. Image correction processing for improving the image quality of the moving recording video data VD1 will be specifically described.

FIG. 19 is a schematic view showing the processes of the image correction processing for the moving recording video data VD1.

In FIG. 19, an example of the value of an R signal is shown in each of the pixel data ED. The same is true for the drawings shown below.

Further, as shown in FIGS. 19 (a) and 19 (b), a plurality of pixel data EDa are reproduced from each of the pixel data ED in each of the pictures composing the moving recording video data VD1, and are adjusted such that the number of pixels in the moving recording video data VD1 is equal to the number of pixels in the main body recording video data VD2 (FIG. 18).

Then, as shown in FIG. 19 (c), the value of each of the pixel data EDa is so corrected as to be an average of the values of the plurality of pixel data ED arranged around the pixel data EDa.

The I picture IP1, the P picture PP1, and the B picture BP1 obtained by the processing shown in FIG. 19 are hereinafter respectively referred to as a first processing I picture IP1a, a first processing P picture PP1a, and a first processing B picture BP1a.

The first processing I picture IP1a is corrected on the basis of the I picture IP2 obtained by the above-mentioned program sampling processing (hereinafter referred to as sampling I picture). The foregoing will be specifically described below using FIG. 20.

Figure 20:
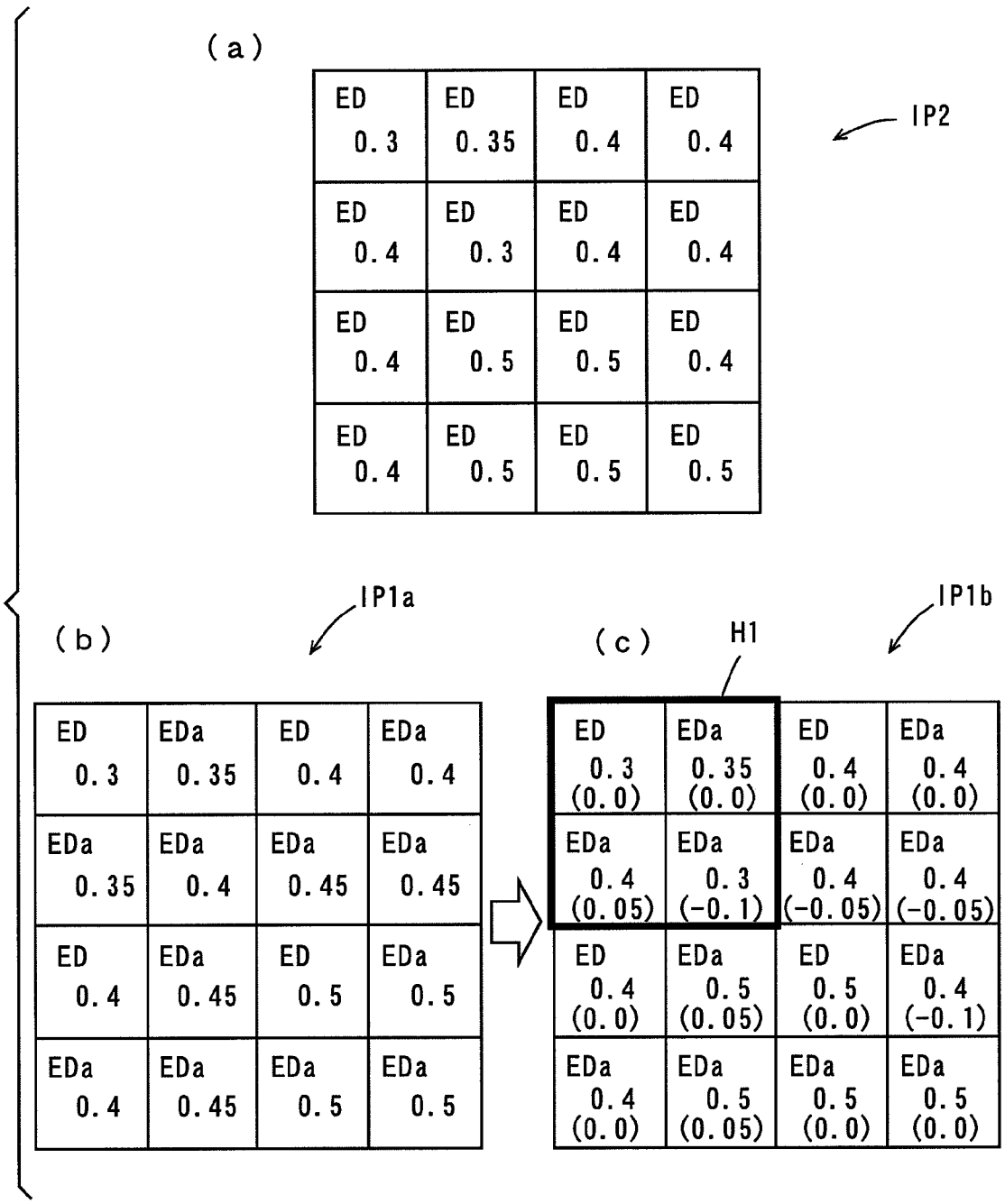
FIG. 20 is a schematic view showing the process of image correction processing.

FIG. 20 (a) is a schematic view showing a part of the sampling I picture IP2, and FIG. 20 (b) is a schematic view showing a part of the first processing I picture IP1a. The sampling I picture IP2 and the first processing I picture shown in FIG. 20 have PCR (Program Clock Reference) representing the same standard time. That is, the sampling I picture IP2 and the first processing I picture P1a correspond to an image at the same time.

As shown in FIG. 20, the pixel data ED and EDa in the first processing I picture IP1a are corrected such that the values thereof are respectively equal to the values of the pixel data ED in the sampling I picture IP2 (see FIG. 20 (c)).

Furthermore, at this time, a difference value between the value before the correction of each of the pixel data ED and EDa and the value thereof after the correction (hereinafter referred to as a difference value for correction) is calculated (see a value within parentheses in FIG. 20 (C)).

The I picture IP1 obtained by the processing shown in FIG. 20 is referred to as a second processing I picture IP1b. A set of difference values for correction calculated by the above-mentioned processing corresponds to a reference image in the claims.

The first processing P picture PP1a (FIG. 18) in the moving recording video data VD1 is corrected using the second processing I picture IP1b and the difference value for correction. The foregoing will be specifically described while referring to FIG. 21.

FIG. 21 is a schematic view for explaining a method of correcting the first processing P picture PP1a. In FIG. 21, 12 pixel data ED and EDa in each of the first processing P picture PP1a and the second processing I picture IP1b are respectively indicated as pixel data ED1 to ED12.

First, as shown in FIG. 21, a motion vector V1 between the second processing I picture IP1b and the first processing P picture PP1a is detected. Examples of a method of detecting the motion vector V1 include a matching method or a gradient method.

Furthermore, the motion vector V1 is detected in block units each composed of a plurality of pixel data. In FIG. 21, a set of four pixel data corresponds to one block.

The motion vector V1 indicates that a block BL1 composed of the pixel data ED1, ED2, ED5, and ED6 in the second I picture IP1b is moved to pixel data ED10, ED11, ED14, and ED15 in the first processing P picture PP1a.

Then, a correspondence relationship between each of the pixel data in the second processing I picture IP1b and the corresponding pixel data in the first processing P picture PP1a is calculated on the basis of the detected motion vector V1.

In FIG. 21, the pixel data ED10, ED11, ED14, and ED15 in the first processing P picture PP1a respectively correspond to the pixel data ED1, ED2, ED5, and ED6 in the second I picture IP1b.

Then, the difference value for correction is added to each of the pixel data in the first processing P picture PP1a on the basis of the calculated correspondence relationship. Here, it is assumed that a value to be added for correction indicated in parentheses in the region H1 shown in FIG. 20 (c) is a difference value for correction in each of the pixel data ED1, ED2, ED5, and ED6 in the second processing I picture IP1b.

In this case, the difference value for correction in the region H1 shown in FIG. 20 (c) is added to each of the values of the pixel data ED10, ED1, ED14, ED15 in the first processing P picture PP1a that respectively correspond to the pixel data ED1, ED2, Ed5, and ED6 in the second processing I picture IP1b.

This allows the first processing P picture PP1a with a high image quality to be obtained. The first processing P picture PP1a corrected by the processing shown in FIG. 21 is hereinafter taken as a second processing P picture PP1b.

Then, the B picture BP1 is similarly corrected on the basis of the second processing I picture IP1b and the second processing P picture PP1b.

In this way, the moving recording video data VD1 is subjected to image correction processing, to correct the I pictures IP1, the P pictures PP1, and the B pictures BP1 in the moving recording video data VD1.

Although description was herein made using the value of the R signal out of the R signal, the G signal, and the B signal, the connection is also similarly made using the values of the G signal and the B signal.

(3-3-2) Program Data Coupling Processing

Figure 22:
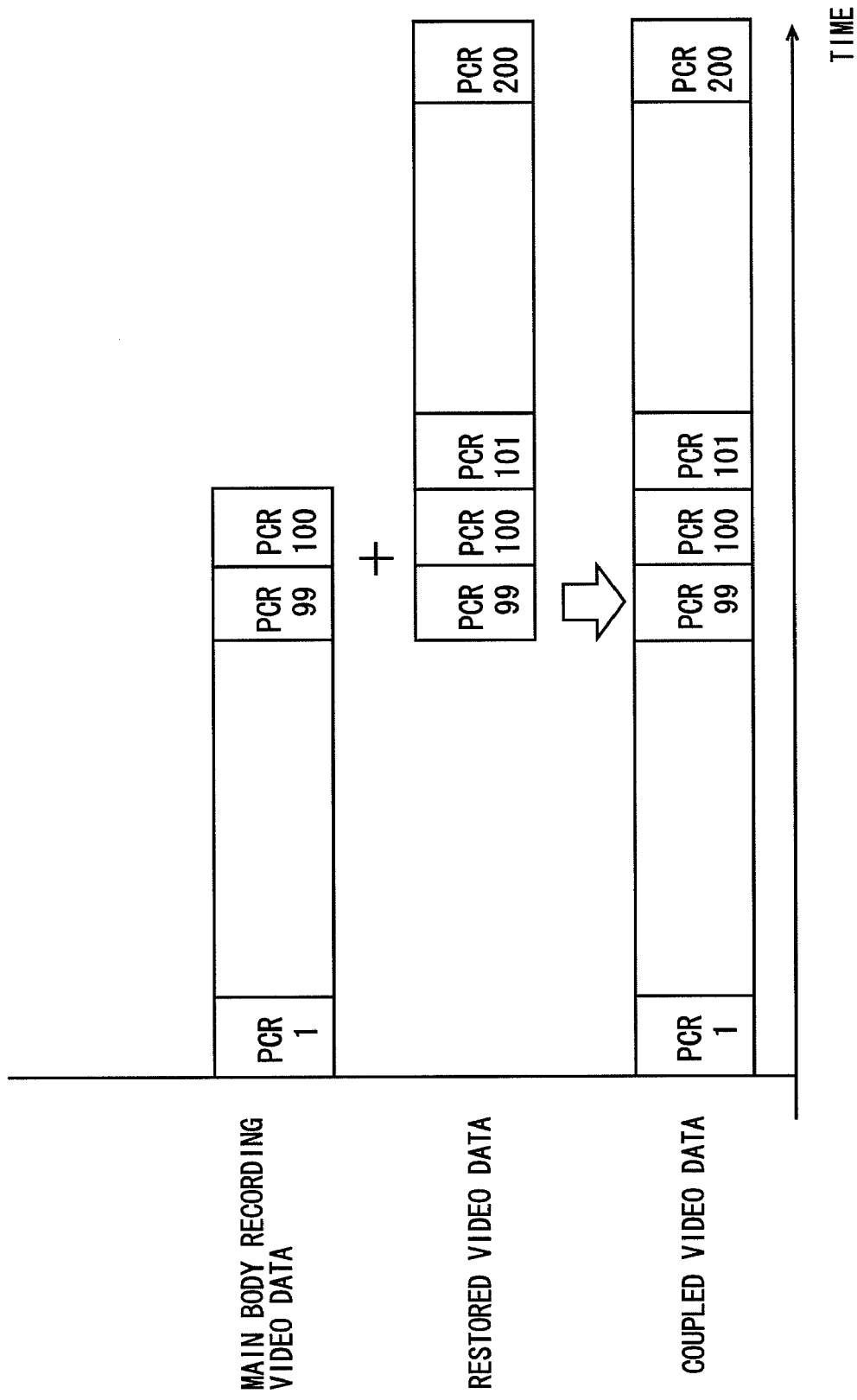
FIG. 22 is a diagram for explaining program data coupling processing.

Moving recording video data obtained by the image correction processing (hereinafter referred to as restored video data) is coupled to video data recorded on the program recorder 12 in the digital broadcasting receiver 10 by program data coupling processing. The program data coupling processing will be described using FIG. 22. In FIG. 22, video data in program data relating to a reserved program will be described.

FIG. 22 is a diagram for explaining the program data coupling processing. In FIG. 22, an upper stage indicates video data relating to a reserved program recorded on the program recorder 12 in the digital broadcasting receiver 10 (main body recording video data VD2), an intermediate stage indicates the video data relating to the reserved program obtained by the above-mentioned image correction processing (restored video data), and a lower stage indicates video data obtained by the program data coupling processing.

As described above, each of pictures (I pictures, P pictures, and B pictures) included in the main body recording video data VD2 and the restored video data has PCR representing the standard time.

In FIG. 22, the main body recording video data VD2 has "1", "2", ..., "100" as the PCR, and the restored video data has "99", "100", ..., "200" as the PCR. In this case, the PCRs "99" and "100" respectively included in the main body recording video data VD2 and the restored video data respectively indicate the equal standard time. Therefore, the controller 17c can recognize a temporal correspondence relationship between the main body recording video data VD2 and the restored video data. This allows the main body recording video data VD2 and the restored video data to be properly coupled to each other.

Although description is herein made of the coupling processing for the video data in the program data, coupling processing for the voice data is performed similarly to the coupling processing for the video data.

The video data obtained by the program data coupling processing is recorded on the program recorder 12 or the I picture recorder 31 in the digital broadcasting receiver 10.

(3-4) Effects of Third Embodiment

In the third embodiment, when the number of programs that are requested to be recorded is more than the number of tuners by the extension of a broadcast time period of the program that has been timer-recorded or when the number of requests for recording is more than the number of tuners by timer-recording the other program or programs within the broadcast time period of the program that has been timer-recorded, the recording medium 50 in the mobile communication device 40 records program data relating to an extended portion of the program that has been timer-recorded or the other program is recorded, and the I picture recorder 31 in the digital broadcasting receiver 10C records an extended portion of the program that has been timer-recorded or an I picture in the other program.

In this case, video data relating to the program recorded by the recording medium 50 in the mobile communication device 40 is corrected using the I picture recorded by the I picture recorder 31. This allows video data with a high image quality to be generated from the video data recorded by the recording medium 50 in the mobile communication device 40.

In the third embodiment, when the program recorder 12 in the digital broadcasting receiver 10C records program data relating to a portion, within the scheduled broadcast time period, of the program that has been timer-recorded, and the recording medium 50 in the mobile communication device 40 records data relating to an extended portion of the program, the program data recorded by the recording medium 50 in the mobile communication device 40 is coupled to the program data recorded by the program recorder 12 in the digital broadcasting receiver 10C, so that one program data is generated.

In this case, video data with a high image quality is generated from the video data recorded by the recording medium 50 in the mobile communication device 40, as described above, which causes a difference in image quality between the video data recorded by the program recorder 12 in the digital broadcasting receiver 10C and the video data recorded by the recording medium 50 in the mobile communication device 40 to be reduced. This allows a video based on the coupled program data to be viewed without any uncomfortable feeling.

(4) Fourth Embodiment (4-1) Configuration of Digital Broadcasting Receiver

The configuration of a digital broadcasting receiving system 100 according to a fourth embodiment will be described below. The digital broadcasting receiving system 100 according to the fourth embodiment includes a digital broadcasting receiver 10D, described below, in place of the digital broadcasting receiver 10 shown in FIG. 2.

Figure 23:
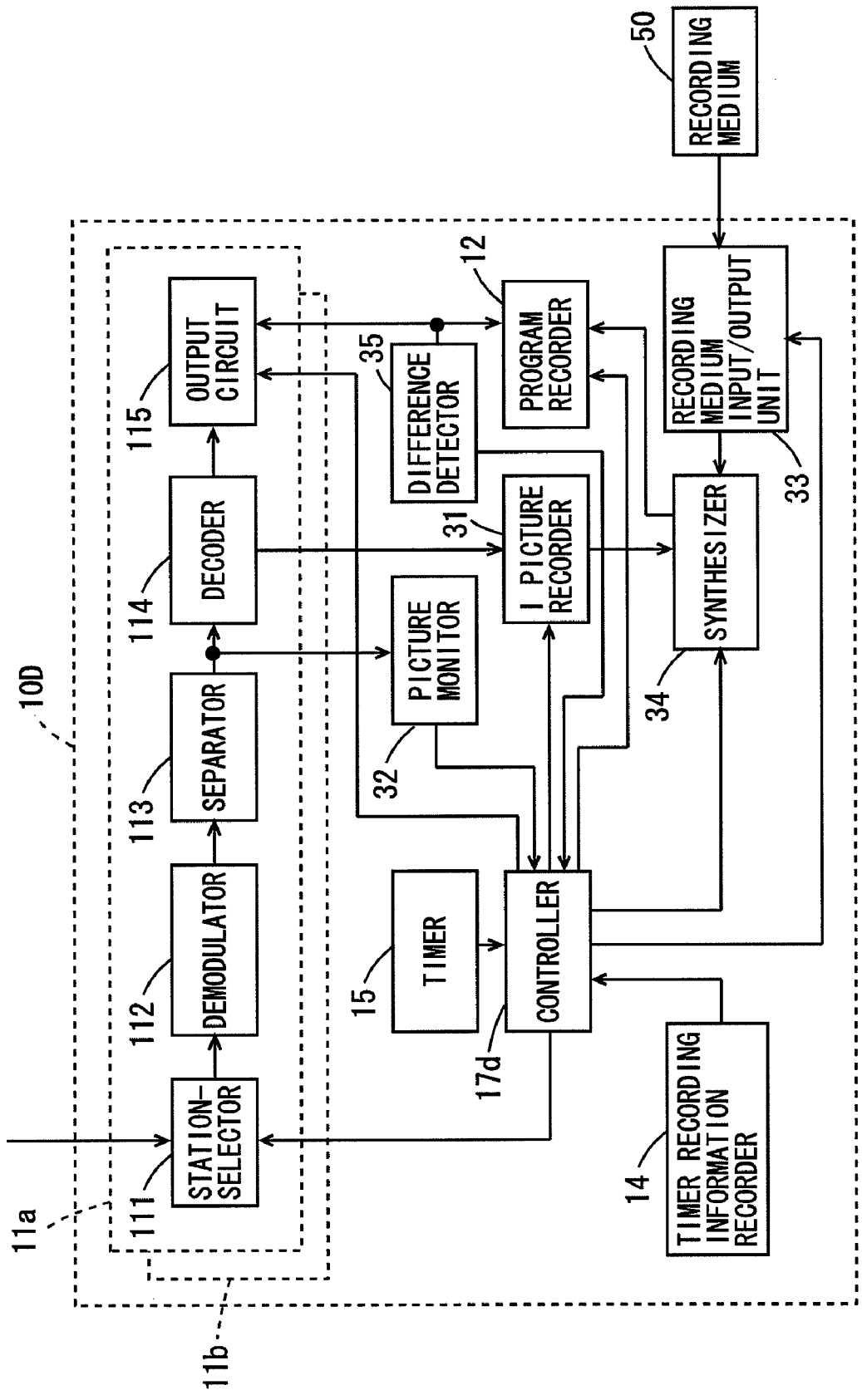
FIG. 23 is a block diagram showing the detailed configuration of a digital broadcasting receiver according to a fourth embodiment.

FIG. 23 is a block diagram showing the detailed configuration of the digital broadcasting receiver 10D. In the configuration of the digital broadcasting receiver 10D, the difference from the digital broadcasting receiver 10C shown in FIG. 12 will be described below.

As shown in FIG. 23, the digital broadcasting receiver 10D includes a difference detector 35 in addition to the components constituting the digital broadcasting receiver 10C shown in FIG. 2. Further, the digital broadcasting receiver 10D includes a controller 17d in place of the controller 17c.

The difference detector 35 detects a difference value between pictures (hereinafter referred to as a picture difference value) included in the video data outputted to a program recorder 12 from an output circuit 115. Specifically, the picture difference value is calculated on the basis of the number of effective data (a motion vector or the like) composing a B picture or a P picture in a VPID (Video Packet Identifier), for example. The controller 17d controls each of components constituting the digital broadcasting receiver 10D.

(4-2) Control Processing at the Time of Recording

Control processing by the controller 17*d* in the digital broadcasting receiver 10D in recording a reserved program will be then described. The controller 17*d* in the digital broadcasting receiver 10D performs control processing different from the controller 17*c* in the digital broadcasting receiver 10C (FIG. 12) in the I picture acquisition processing shown in FIG. 15. Control processing by a controller 46 in a mobile communication device 40 is the same as that in the first embodiment (see FIG. 6).

The I picture acquisition processing by the controller 17*d* will be described below while referring to FIGS. 23 and 24.

Figure 24:
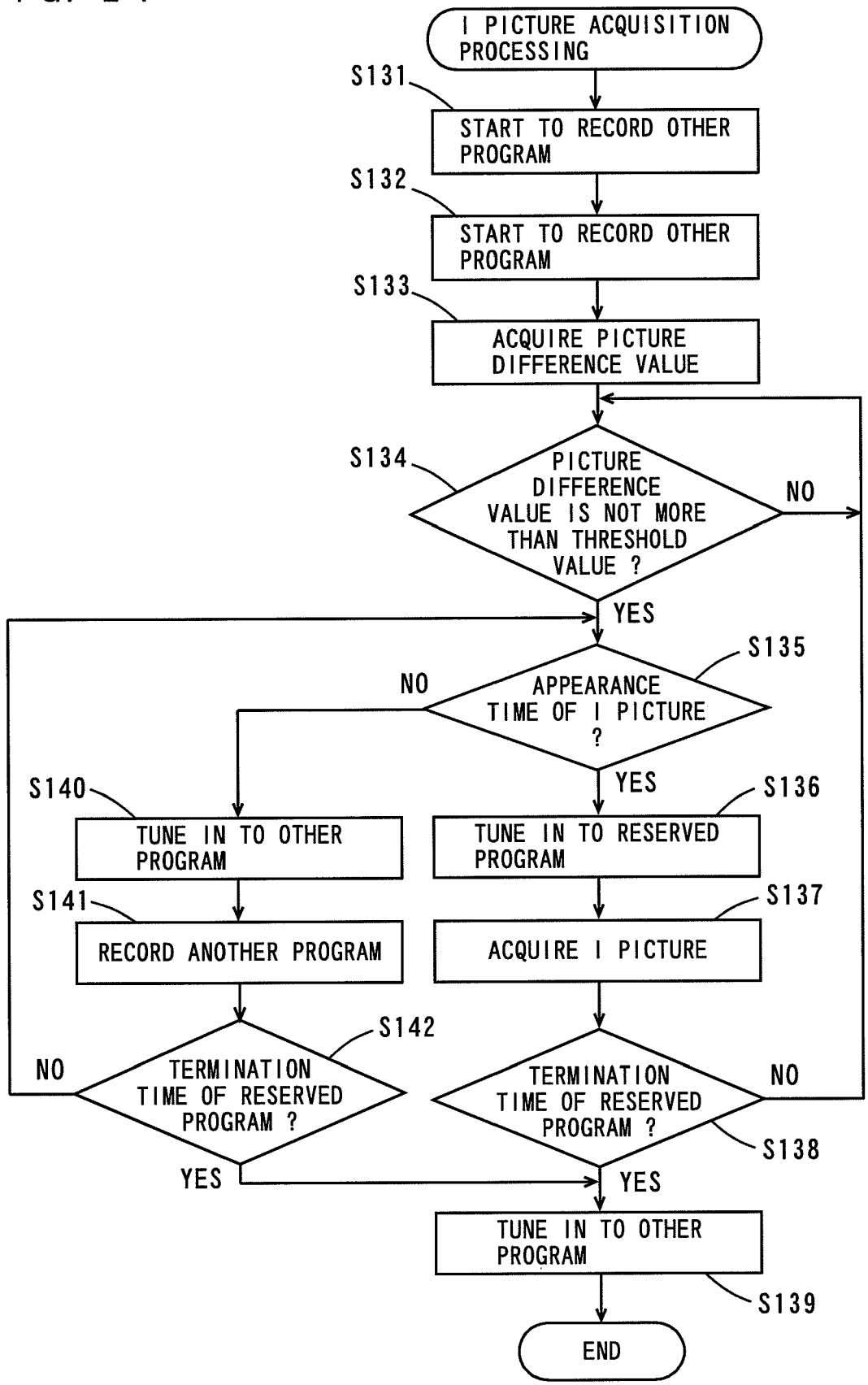
FIG. 24 is a flow chart showing I picture acquisition processing by a controller.

FIG. 24 is a flow chart showing the I picture acquisition processing by the controller 17*d*.

As shown in FIG. 24, the controller 17*d* first causes a station selector 111 to tune in to other program or programs (step S131), and causes the program recorder 12 to start to record the other program (step S132).

Then, the controller 17*d* acquires a picture difference value detected by the difference detector 25 (step S133).

Then, the controller 17*d* determines whether or not the acquired picture difference value is not more than a previously set threshold value (step S134).

When the acquired picture difference value is not more than the previously set threshold value, a video in the other program hardly changes, which means that the video is close to a still picture. In this case, the controller 17*d* determines whether or not the current time is the appearance time of an I picture in the reserved program on the basis of time information from a timer 15 (step S135).

When the current time is the appearance time of the I picture in the reserved program, the controller 17*d* causes the station selector 111 to tune in to the reserved program (step S136), and causes an I picture recorder 31 to record the I picture in the reserved program (step S137).

Then, the controller 17*d* determines whether or not the current time is the termination time of broadcasting of the reserved program (step S138). When a broadcast time period of the reserved program is extended, as described above, the termination time of broadcasting of the reserved program is determined on the basis of extension termination information extracted by an extension information extractor (FIG. 2). On the other hand, when the broadcast time period of the reserved program is not extended, the termination time of broadcasting of the reserved program is determined on the basis of timer recording information recorded on a timer recording information recorder 14.

When the current time is the termination time of broadcasting of the reserved program, the controller 17*d* tunes in to the other program (step S139), to terminate the processing.

On the other hand, when the acquired picture difference value is more than the previously set threshold value in the step S134, this means that the amount of change in a video in the other program is large. In this case, the controller 17*d* is returned to the processing in the step S133.

Furthermore, when the current time is not the appearance time of the I picture in the reserved program in the step S135, the controller 17*d* causes the station selector 111 to tune in to the other program (step S140), and causes the program recorder 12 to record the other program (step S141).

Then, the controller 17*d* determines whether or not the current time is the termination time of broadcasting of the reserved program (step S142).

When the current time is the termination time of broadcasting of the reserved program, the controller 17*d* proceeds to the processing in the step S139.

When the current time is not the termination time of broadcasting of the reserved program in the step S142, the controller 17 is returned to the processing in the step S135.

Furthermore, when the current time is not the termination time of broadcasting of the reserved program, the controller 17*d* is returned to the processing in the step S133.

(4-2-a) Tuning State at the Time of Program Sampling Processing

Figure 25:
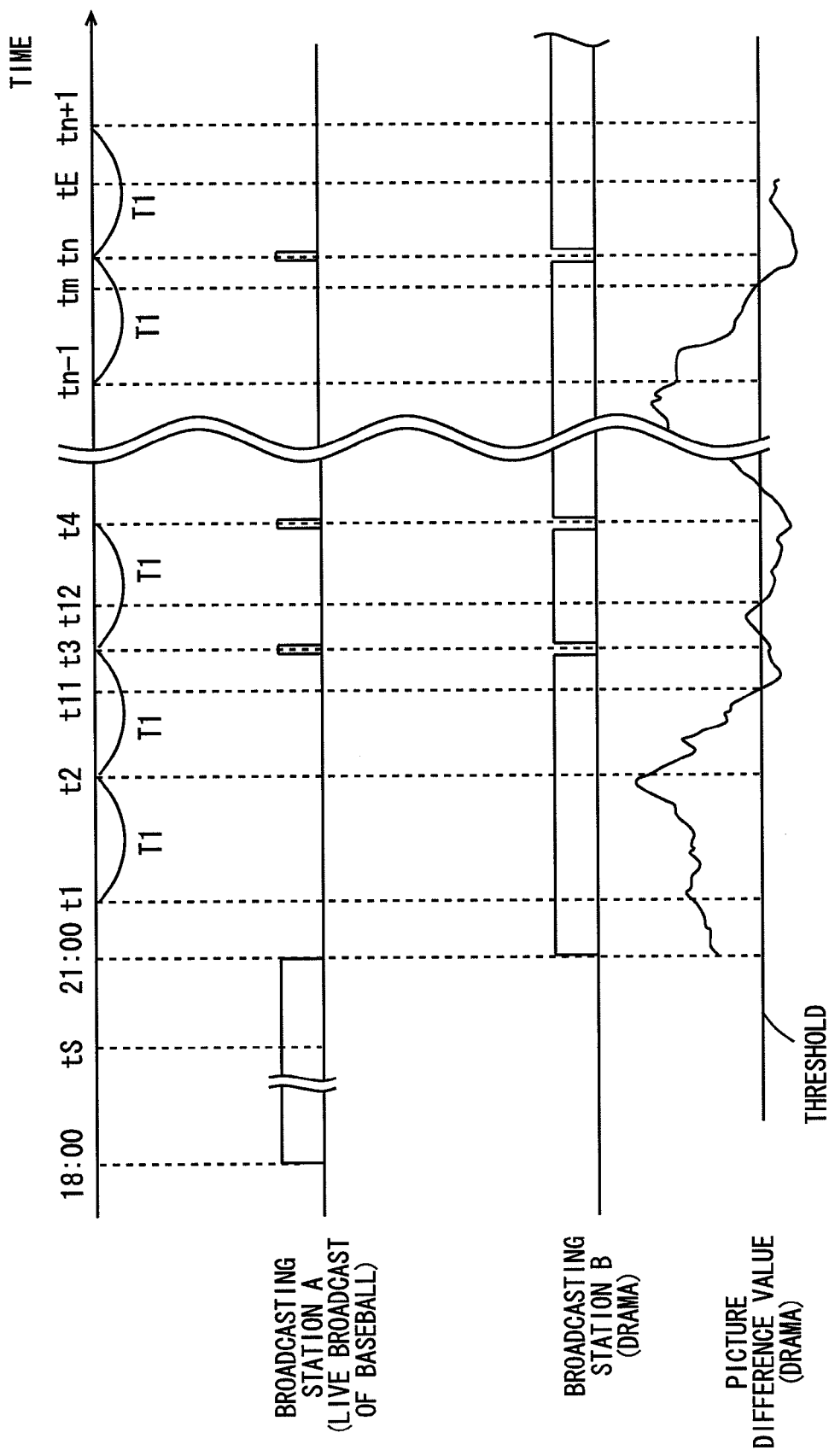
FIG. 25 is a timing chart for explaining a tuning state at the time of program sampling processing in the fourth embodiment.

A tuning state by the station selector 111 at the time of program sampling processing in a case where the I picture acquisition processing shown in FIG. 24 is performed will be then described in detail using FIG. 25.

FIG. 25 is a timing chart for explaining a tuning state at the time of the program sampling processing in the fourth embodiment. In FIG. 25, the horizontal axis indicates time, and a state where the station selector 111 tunes in is indicated at a high level, while a state where the station selector 111 does not tune is indicated at a low level. Further, a picture difference value in the other program is indicated in a lower stage.

Description is herein made of a case where in the broadcasting schedule shown in FIG. 7, a live broadcast of baseball at a broadcasting station A is timer-recorded as a reserved program, a drama at a broadcasting station B is timer-recorded as the other program, and a broadcast time period of the live broadcast of baseball is extended.

As shown in FIG. 25, a broadcasting signal from the broadcasting station A is first tuned in to within a scheduled broadcast time period of the live broadcast of baseball (18:00 to 21:00). Here, at the time tS before the scheduled termination time of broadcasting of the live broadcast of baseball (21:00), extension start information is transmitted from the broadcasting station A. In this case, the above-mentioned I picture monitoring processing is performed from the time tS to 21:00. Thus, the appearance period T1 of the I picture in the live broadcast of baseball and the appearance times t1, t2, t3, t4, . . . , tn−1, tn, tn+1, . . . of the I picture are calculated.

Then, in an extended time period of the live broadcast of baseball, i.e., a time period elapsed from 21:00 until the broadcasting of the live broadcast of baseball is terminated, the I picture acquisition processing shown in FIG. 24 is performed. The termination time of broadcasting of the live broadcast of baseball is the time tE between the time tn and the time tn+1.

In the fourth embodiment, the live broadcast of baseball is turned in to only when a picture difference value in a drama is not more than a threshold value. In the example shown in FIG. 25, the time t11 between the time t2 and the time t3, the time t12 between the time t3 and the time t4, . . . , the time tm between the time tn−1 and the time tn, the picture difference value in the drama is not more than the threshold value.

In this case, the broadcasting signal from the broadcasting station A is tuned in to at the appearance times t3, t4, . . . , tn of the I picture in the live broadcast of baseball immediately after the times t11, t12, . . . , tm, and a broadcasting signal from the broadcasting station B is tuned in to in a time period other than the appearance times of the I picture and a time period during which the picture difference value in the drama is more than the threshold value. After the broadcasting of the live broadcast of baseball is terminated, the broadcasting signal from the broadcasting station B is turned in to.

(4-3) Effects of Fourth Embodiment

In the fourth embodiment, in a case where the I picture recorder 31 records the I picture in the one program that has been timer-recorded, while the program recorder 12 records the program data relating to the other program that has been timer-recorded, the one program is turned in to at the appearance time of the I picture only when the picture difference value in the other program is not more than the threshold value, while a broadcasting signal corresponding to the other program is turned in to even at the appearance time of the I picture in the one program when the picture difference value in the other program is more than the threshold value.

In this case, even if the recording of the other program is interrupted in order to tune in to the one program, a video in the other program hardly changes in the time period, so that the video is close to a still picture. This allows the other program recorded by the program recorder 12 to be viewed without any uncomfortable feeling.

(5) Fifth Embodiment (5-1) Configuration of Digital Receiving System

The configuration of a digital broadcasting receiving system 100 according to a fifth embodiment will be described below. The digital broadcasting receiving system 100 according to the fifth embodiment includes a digital broadcasting receiver 10E, described below, in place of the digital broadcasting receiver 10 shown in FIG. 2.

Figure 26:
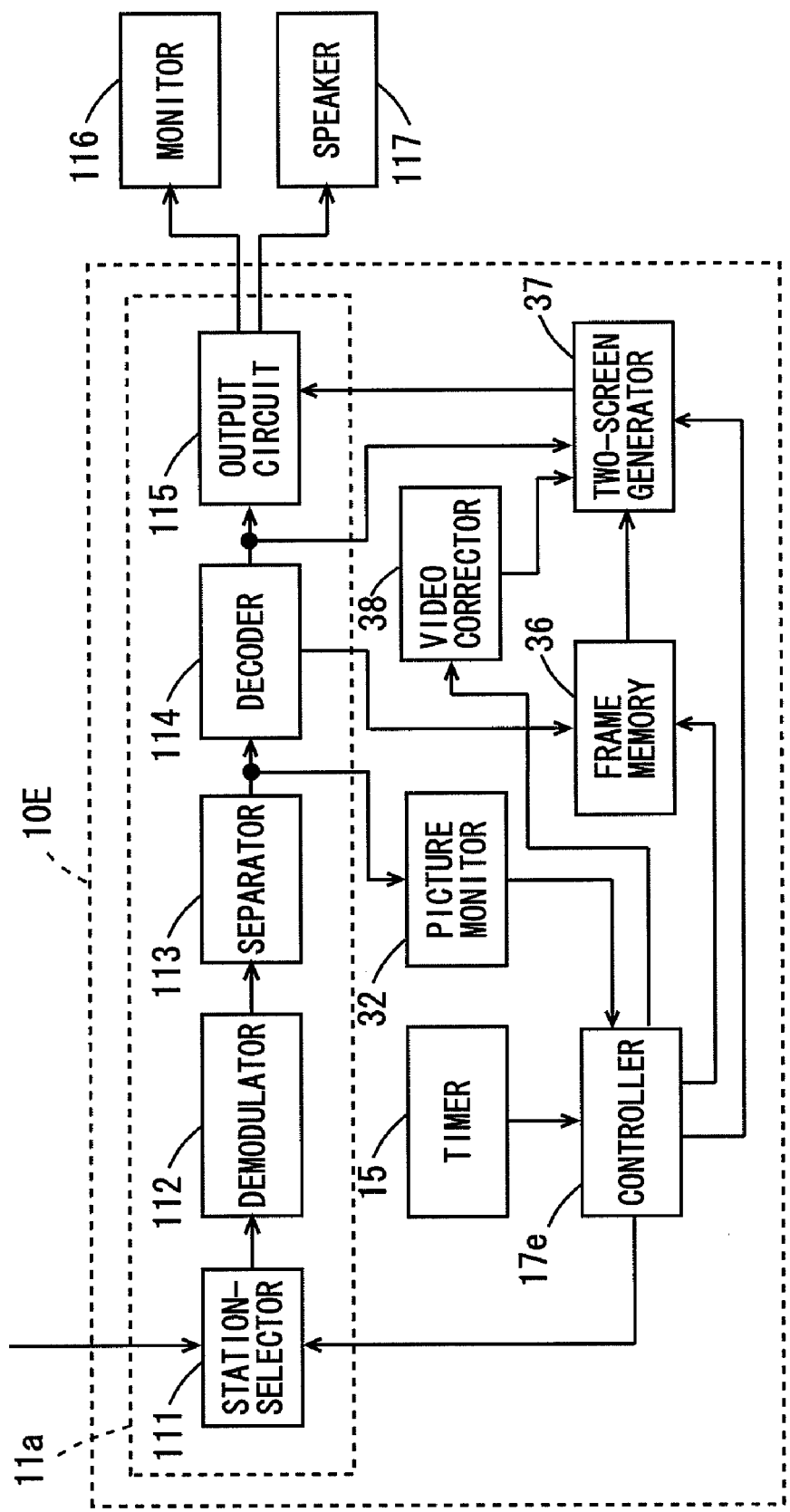
FIG. 26 is a block diagram showing the detailed configuration of a digital broadcasting receiver according to a fifth embodiment.

FIG. 26 is a block diagram showing the detailed configuration of the digital broadcasting receiver 10E. In the configuration of the digital broadcasting receiver 10E, the difference from the digital broadcasting receiver 10C shown in FIG. 12 will be described below.

As shown in FIG. 26, the digital broadcasting receiver 10E includes a frame memory 36, a two-screen generator 37, and a video complementary processor 38 in addition to the components constituting the digital broadcasting receiver 10C shown in FIG. 12. Further, the digital broadcasting receiver 10E includes a controller 17e in place of the controller 17c.

Although in the first, second, third, and fourth embodiments, description was made of a case where each of the digital broadcasting receiver 10A, 10B, 10C, and 10D has two tuners 11a and 11b, a case where the digital broadcasting receiver 10E has one tuner 11a will be described in the fifth embodiment.

The frame memory 36 outputs an I picture in program data (including voice data and video data) outputted from a decoder 114 to the two-screen generator 37 while temporarily storing the I picture.

The two-screen generator 37 synthesizes the I picture outputted from the frame memory 36 and the video data outputted from the decoder 114, to generate two-screen video data for simultaneously displaying on a monitor 116 a video based on the I picture and a video based on the video data. Further, the two-screen generator 37 feeds the generated two-screen video data to an output circuit 115.

The video complementary processor 38 subjects the video data outputted from the decoder 114 to video complementary processing. The details will be described later.

The controller 17e controls each of the components constituting the digital broadcasting receiver 10E. The details of the control processing by the controller 17e will be described later.

Figure 27:
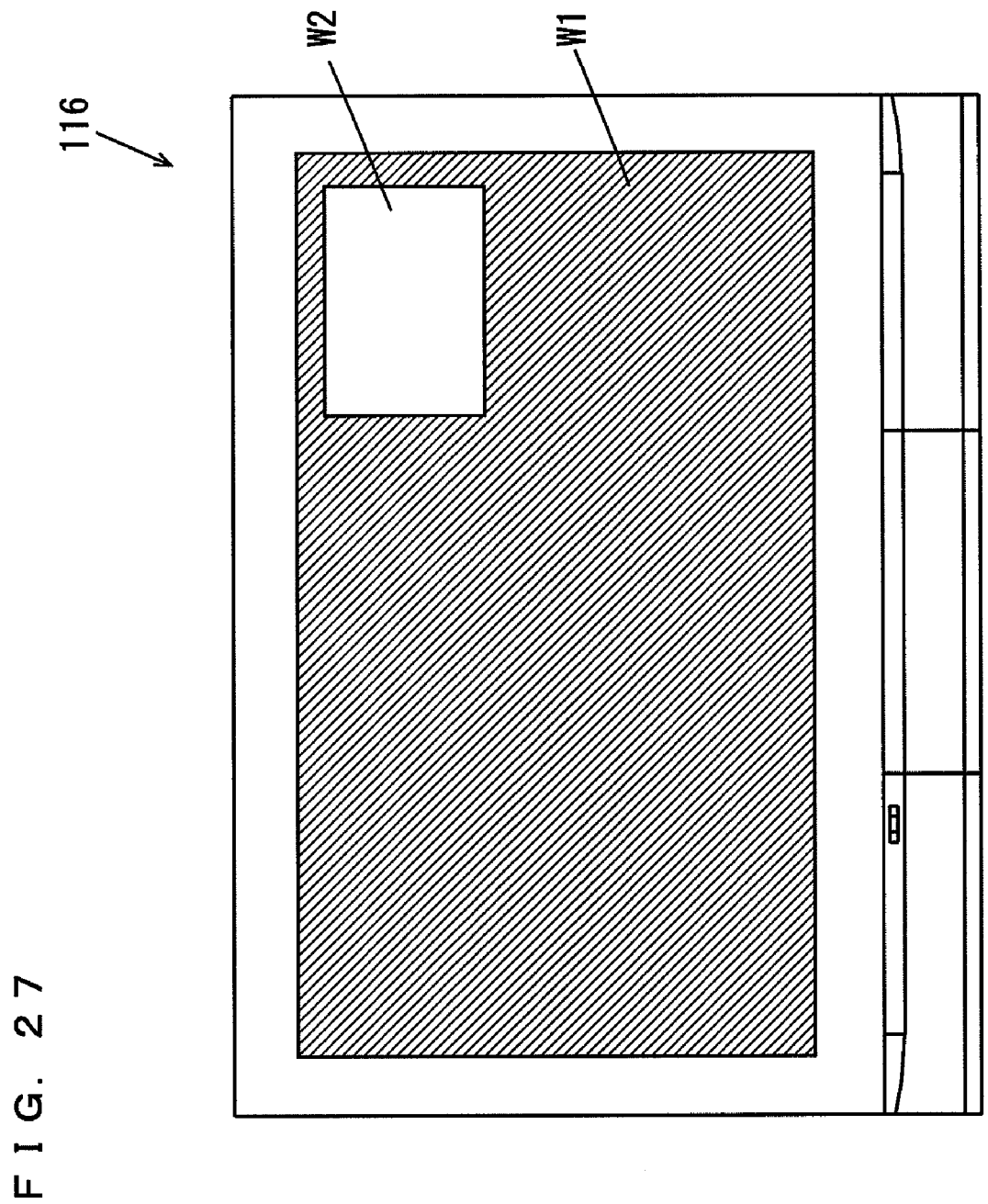
FIG. 27 is a diagram showing a specific example of a video obtained on the basis of two-screen video data.

FIG. 27 is a diagram showing a specific example of a video obtained on the basis of the two-screen video data.

As shown in FIG. 27, a two-screen video composed of a screen W1 (a hatched portion) and a screen W2 is displayed on the monitor 116. In the present embodiment, the video based on the video data outputted from the video complementary processor 38 is displayed on the screen W1, and the video based on the I picture outputted from the frame memory 36 is displayed on the screen W2.

In the digital broadcasting receiver 10E having the foregoing configuration, when a user requests to view two programs within the same time period, the two programs can be simultaneously displayed on the monitor 116.

Description is now made of the details of the control processing by the controller 17e in a case where a user requests to view two programs within the same time period. In the following description, one of the two programs that are requested to be viewed by the user is taken as a first program, and the other program is taken as a second program.

First, the controller 17e causes a station selector 111 to tune in to a broadcasting signal corresponding to the first program, to perform I picture monitoring processing shown in FIG. 14. This causes the controller 17e to calculate the appearance time of an I picture in the first program.

Then, the controller 17e performs two-screen display processing using the calculated appearance time of the I picture in the first program.

Figure 28:
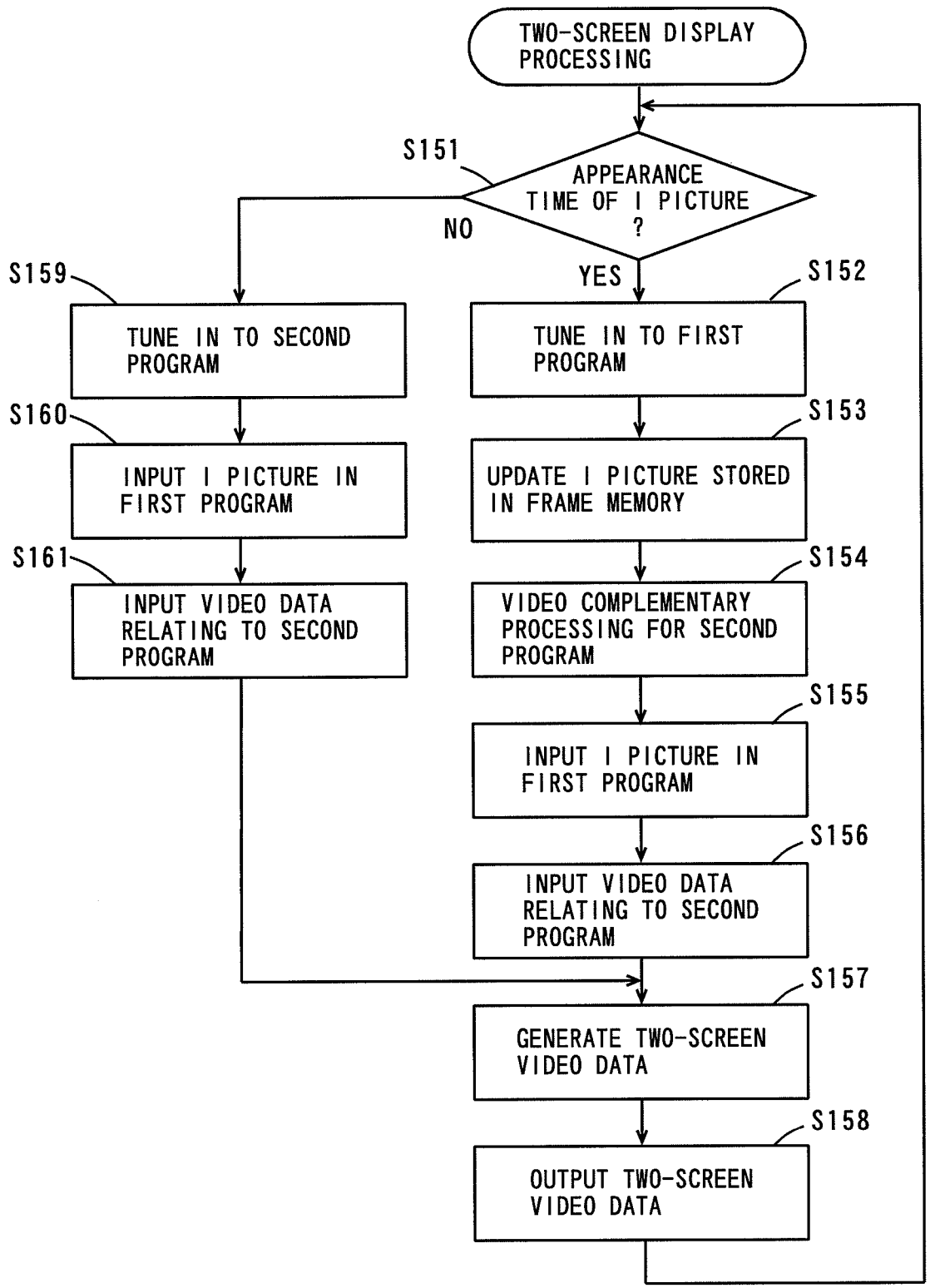
FIG. 28 is a flow chart showing two-screen display processing by a controller.

Referring now to FIGS. 26 and 28, the two-screen display processing will be described. FIG. 28 is a flow chart showing the two-screen display processing by the controller 17e.

The controller 17e determines whether or not the current time is the appearance time of the I picture in the first program on the basis of time information from the timer 15 (step S151).

When the current time is the appearance time of the I picture in the first program, the controller 17e causes the station selector 111 to tune in to the first program (step S152), and updates the I picture in the first program stored in the frame memory 36 (step S153). In this case, the I picture previously stored is deleted, and an I picture newly obtained is stored in the frame memory 36.

Then, the controller 17e causes the video complementary processor 38 perform video complementary processing for the second program (step S154). In the video complementary processing, video data relating to the second program in a time period during which the station selector 111 tunes in to the first program is complemented using a motion vector from video data relating to the second program immediately before and immediately after the video data.

Then, the controller 17e inputs the I picture newly stored in the frame memory 36 into the two-screen generator 37 (step S155), and inputs the video data relating to the second program after the video complementary processing into the two-screen generator 37 (step S156).

Then, the controller 17e causes the two-screen generator 37 to generate the two-screen video data using the I picture in the first program from the frame memory 36 and the video data relating to the second program after the video complementary processing (step S157).

Then, the controller 17e outputs the generated two-screen video data to the monitor 116 through the output circuit 115 (step S158), to return to the processing in the step S151.

On the other hand, when the current time is not the appearance time of the I picture in the first program in the step S151, the controller 17e causes the station selector 111 to tune in to the second program (step S159).

Then, the controller 17e inputs the I picture in the first program stored in the frame memory 36 into the two-screen generator 37 (step S160), and inputs the video data relating to the second program into the two-screen generator 37 (step S161), to proceed to the processing in the step S157. In this case, the video complementary processor 38 does not perform the video complementary processing for the video data relating to the second program.

In the fifth embodiment, the first and second programs can be thus simultaneously displayed on the monitor 116 using the I picture in the first program and the video data relating to the second program. In this example, a video in the second program is displayed as a moving picture having a continuous change. On the other hand, in a video in the first program, an image based on the I picture is displayed by frame advance.

In such a configuration, the video based on only the I picture in the first program is also displayed on the region W2 of the monitor 116 shown in FIG. 27. Even when the display is not continuous, the user can view the first program and the second program without feeling uncomfortable.

(6) Modification (6-1)

The I picture recorder 31, the picture monitor 32, the recording medium input/output unit 33, and the synthesizer 34 in the digital broadcasting receiver 10C according to the third embodiment may be provided in the digital broadcasting receiver 10B according to the second embodiment. Further, the difference detector 35 in the digital broadcasting receiver 10D according to the fourth embodiment may be provided in the digital broadcasting receiver 10B according to the second embodiment.

Furthermore, the frame memory 36, the two-screen generator 37, and the video complementary processor 38 in the digital broadcasting receiver 10D according to the fifth embodiment may be provided in the digital broadcasting receiver 10B according to the second embodiment.

(6-2)

The controllers 17, 46, 17b, 17c, 17d, and 17e, the extension information extractor 13, the position detector 44, the picture monitor 32, the synthesizer 34, the difference detector 35, and the two-screen generator 37 in the first to fifth embodiments may be realized by hardware such as an electronic circuit. Alternatively, some or all of the components may be realized by hardware such as a CPU (Central Processing Unit) and software such as a program.

(6-3)

The program recorder 12, the timer recording information recorder 14, the frequency table recorder 21, and the I picture recorder 31 in the first to fifth embodiments may be realized by various types of recording media such as a hard disk, a semiconductor memory, a memory card, and a DVD (Digital Video Disc).

(6-4)

Although in the first to fourth embodiments, each of the digital broadcasting receivers 10, 10B, 10C, and 10D has two tuners 11a and 11b, the present invention is not limited to the same. For example, it may have one or three or more tuners. Although in the fifth embodiment, the digital broadcasting receiver 10E has one tuner 11a, it may have two or more tuners.

(6-5)

Each of the digital broadcasting receivers 10C and 10D in the third and fourth embodiments may include a video complementary processor 38, as in the fifth embodiment. In this case, the video data relating to the other program at the time of recording the I picture in the one program that has been timer-recorded is complemented. This allows the other program to be viewed without any uncomfortable feeling.

(6-6)

Although in the first to fifth embodiments, description was made of an example in which each of the digital broadcasting receivers 10, 10B, 10C, and 10D has video data having a video format in a progressive system with 1080 horizontal scanning lines, the present invention is not limited to the same. For example, the video data may have another video format.

Although in the first to fifth embodiments, description was made of an example in which the mobile communication device 40 outputs video data having a video format in a progressive system with 525 horizontal scanning lines, the present invention is not limited to the same. For example, the video data may have another video format.

(6-7)

Although in the first to fifth embodiments, description was made of an example in which each of the digital broadcasting receivers 10, 10B, 10C, and 10D receives 12 segment broadcasting signals, and the mobile communication device 40 receives one segment broadcasting signal, the present invention is not limited to the same. For example, each of the digital broadcasting receiver 10, 10B, 10C, 10D, or 10E or the mobile communication device 40 may receive a broadcasting signal in another transmission form.

(6-8)

Although in the first to fifth embodiments, description was made of a case where a plurality of programs that differ in frequencies are simultaneously recorded, the present invention is not limited to the same. For example, a plurality of sub-programs included in one broadcasting signal may be simultaneously recorded.

(7) Correspondences Between Elements in the Claims and Parts in Embodiments

In the following two paragraphs, non-limiting examples of correspondences between various elements recited in the claims below and those described above with respect to various preferred embodiments of the present invention are explained.

In the digital broadcasting receiving system 100 according to the embodiments described above, the tuners 11a and 11b correspond to a first receiver, the timer recording information recorder 14 corresponds to an information holder, the program recorder 12 corresponds to a first data recorder, the controllers 10, 10b, 10c, 10d, and 10e correspond to a first determination unit, the controller 46 corresponds to a second determination unit, the information transmitter 16 corresponds to a first communicator, the information receiver 43 corresponds to a second communicator, the broadcasting signal receiver 41 corresponds to a second receiver, and the recording medium 50 corresponds to a second data recorder.

Furthermore, in the digital broadcasting receiver 10, the tuners 11a and 11b correspond to a receiver, the timer recording information recorder 14 corresponds to an information holder, the program recorder 12 corresponds to a first data recorder, the controllers 10, 10b, 10c, 10d, and 10e correspond to a determination unit, the information transmitter 16 corresponds to a communicator, the extension information extractor 13 corresponds to an extractor that extracts extension information, the frequency table recorder 21 corresponds to a correspondence information recorder, the I picture recorder 31 corresponds to a picture recorder, the synthesizer 34 corresponds to a corrector, the second processing P picture PP1b corresponds to restored program data, the controllers 10c, 10d, and 10e correspond to a period calculator, the difference detector 35 corresponds to a picture difference detector, and the controller 10d corresponds to a difference value determination unit.

The controller 10e corresponds to a controller, and the frame memory 36 corresponds to an I picture extractor.

Furthermore, in the mobile communication device 40, the information receiver 43 corresponds to a communicator, the broadcasting signal receiver 41 corresponds to a receiver, the recording medium 50 corresponds to a data recorder, the recorder 45 corresponds to a correspondence information recorder, the controller 46 corresponds to a determination unit, and the impossible-to-receive signal corresponds to an impossible-to-acquire signal.

INDUSTRIAL APPLICABILITY

The present invention is applicable to various types of digital broadcasting receiving apparatuses having a digital broadcasting receiving function such as a general television receiver, a personal computer, a DVD decoder, and a cellular phone.

The invention claimed is:

1. A digital broadcasting receiving system, comprising:
a digital broadcasting receiver that receives digital broadcasting; and
a mobile communication device having a digital broadcasting receiving function,
wherein said digital broadcasting receiver includes:
n (n is a natural number) first receivers that each acquire program data including at least video data from one, corresponding to a selected program, of broadcasting signals on the received digital broadcasting,
an information holder that holds timer recording information representing a program that has been timer-recorded,
a first data recorder that records the program data relating to a program acquired by each of said n first receivers as program data relating to a first program on the basis of the timer recording information held in said information holder,
a first determiner that determines the number of programs that are requested to be recorded at a same time on a basis of the timer recording information held in said information holder as the number of requests for recording and determines program data relating to a program that is not recorded on said first data recorder as program data relating to a second program when the number of requests for recording exceeds n, and
a first communicator that transmits to said mobile communication device recording instruction information for giving an instruction to record the program data relating to said second program when the number of requests for recording exceeds n,
said mobile communication device includes:
a second communicator that receives the recording instruction information transmitted from said digital broadcasting receiver,
a second receiver that acquires program data including at least video data from one, corresponding to the second program, of the broadcasting signals on the received digital broadcasting on the basis of the recording instruction information received by said second communicator, and
a second data recorder that records the program data acquired by said second receiver.

2. A digital broadcasting receiver that receives digital broadcasting and can communicate with a mobile communication device, comprising:
n (n is a natural number) receivers that each acquire program data including at least video data from one, corresponding to a selected program, of broadcasting signals on the received digital broadcasting;
an information holder that holds timer recording information representing a program that has been timer-recorded,
a data recorder that records the program data relating to a program acquired by each of said n receivers as program data relating to a first program on the basis of the timer recording information held in said information holder;
a determiner that determines the number of programs that are requested to be recorded at the same time on the basis of the timer recording information held in said information holder as the number of requests for recording and determines program data relating to a program that is not recorded on said data recorder as program data relating to a second program when the number of requests for recording exceeds n, and
a communicator that transmits to said mobile communication device recording instruction information for giving an instruction to record the program data relating to said second program when the number of requests for recording exceeds n.

3. The digital broadcasting receiver according to claim 2, further comprising:
an extractor that extracts extension information representing the extension of a broadcast time period of the program that has been timer-recorded from the broadcasting signal on the received digital broadcasting,
wherein said determiner determines the number of requests for recording on the basis of the extension information extracted by said extractor and the timer recording information held in said information holder and determines program data relating to an extended portion of said program that has been timer-recorded or program data relating to the other program as the program data relating to the second program when the number of requests for recording exceeds n by the extension of the program that has been timer-recorded.

4. The digital broadcasting receiver according to claim 2, further comprising:
a correspondence information recorder that records correspondence information representing a correspondence relationship among a region, a broadcasting station, and a frequency,
wherein said communicator specifies the frequency of the second program whose recording is designated on the basis of the correspondence information recorded on said correspondence information recorder, and transmits recording instruction information including the specified frequency to said mobile communication device.

5. The digital broadcasting receiver according to claim 2, wherein
said determiner changes, when said communicator receives an impossible-to-acquire signal indicating that it is impossible for said mobile communication device to acquire the program data relating to the second program designated by the recording instruction information, any one of the original first programs into a new second program and changes the original second program into a new first program, and
said communicator transmits to said mobile communication device the recording instruction information for giving an instruction to record program data relating to the new second program.

6. The digital broadcasting receiver according to claim 2, wherein any one of said n receivers intermittently selects the broadcasting signal corresponding to the second program, further comprising:

a picture recorder that extracts an I picture from the broadcasting signal selected by said receiver and records the extracted I picture, and a corrector that corrects the program data relating to the second program recorded in said mobile communication device using the I picture recorded by said picture recorder, to generate restored program data.

7. The digital broadcasting receiver according to claim 6, wherein said corrector generates a reference image on the basis of a difference between the I picture recorded by said picture recorder and the I picture in the program data relating to the second program recorded in said mobile communication device, to correct the program data relating to said second program on the basis of the generated reference image.

8. The digital broadcasting receiver according to claim 7, wherein said corrector calculates a motion vector from the program data relating to the second program recorded in said mobile communication device, and adds pixel values in a block of said reference image to pixel values in a corresponding block of the P picture in the program data relating to the second program on the basis of the calculated motion vector, to generate restored program data.

9. The digital broadcasting receiver according to claim 8, wherein said corrector generates a B picture in said restored program data on the basis of the I picture recorded by said picture recorder and the P picture in the program data relating to the second program recorded in said mobile communication device.

10. The digital broadcasting receiver according to claim 6, further comprising:

a period calculator that previously calculates a period of the I picture in the program data relating to said second program, wherein said receiver selects the broadcasting signal corresponding to the second program in the period calculated by said period calculator.

11. The digital broadcasting receiver according to claim 6, further comprising:

a picture difference detector that detects a difference value between pictures in the broadcasting signal corresponding to the first program selected by said receiver, and a difference value determiner that determines whether or not the difference value detected by said picture difference detector is not more than a predetermined threshold value, wherein the receiver selects, when said picture difference determiner determines that said difference value is not more than said threshold value, the broadcasting signal corresponding to the second program in the period calculated by said period calculator.

12. A mobile communication device that has a digital broadcasting receiving function and can communicate with a digital broadcasting receiver, comprising:

a communicator that receives recording instruction information for giving an instruction to record program data relating to a program from said digital broadcasting receiver;

a receiver that acquires program data including at least video data from one, corresponding to said program, of broadcasting signals on the received digital broadcasting on a basis of the recording instruction information received by said communicator;

a data recorder that records the program data acquired by said receiver;

a correspondence information recorder that records correspondence information representing a correspondence relationship among a region, a broadcasting station, and a frequency, and a position detector that detects a current position, wherein said receiver specifies the frequency of said program whose recording has been designated on the basis of the recording instruction information received by said communicator, the correspondence information recorded by said correspondence information recorder, and the current position detected by said position detector, to select the broadcasting signal corresponding to said program on a basis of the specified frequency.

13. The mobile communication device according to claim 12, further comprising:

a position detector that detects the current position, wherein said receiver specifies the frequency of said program whose recording has been designated on a basis of the recording instruction information including the frequency received by said communicator and the current position detected by said position detector, to select the broadcasting signal corresponding to said program on the basis of the specified frequency.

14. The mobile communication device according to claim 12, further comprising:

a determiner that determines whether or not the program data relating to said program designated by the recording instruction information received by said communicator can be acquired, said communicator transmits, when said determiner determines that the program data relating to said program designated by the recording instruction information cannot be acquired, an impossible-to-acquire signal indicating that it is impossible to acquire the program data relating to said program designated by the recording instruction information to said digital broadcasting receiver.

* * * * *

UNITED STATES PATENT AND TRADEMARK OFFICE
CERTIFICATE OF CORRECTION

PATENT NO. : 8,249,429 B2  
APPLICATION NO. : 11/912526  
DATED : August 21, 2012  
INVENTOR(S) : T. Iwamoto Page 1 of 1

It is certified that error appears in the above-identified patent and that said Letters Patent is hereby corrected as shown below:

On the Cover page, (56) References Cited, Foreign Documents, please add

--DOCUMENT

| NUMBER | DATE | COUNTRY |
|---|---|---|
| 2003-199004 | 07/11/2003 | JAPAN |
| WO2005/036880 | 04/21/2005 | JAPAN |
| 2002-016889 | 01/18/2002 | JAPAN |
| 2002-300502 | 10/11/2002 | JAPAN |
| 2002-112153 | 04/12/2002 | JAPAN |
| 2004-215219 | 07/29/2004 | JAPAN-- |

In Other Publications insert

--JAPAN Office action, mail date is 11/30/2010.--

Signed and Sealed this  
Thirteenth Day of November, 2012

David J. Kappos  
*Director of the United States Patent and Trademark Office*